(12) United States Patent
Cragun

(10) Patent No.: US 6,229,544 B1
(45) Date of Patent: May 8, 2001

(54) TILED IMAGE EDITOR

(75) Inventor: Brian John Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/926,663

(22) Filed: Sep. 9, 1997

(51) Int. Cl.⁷ .................................................. G06T 15/00
(52) U.S. Cl. .......................................... 345/418; 345/433
(58) Field of Search ................................... 345/418, 419, 345/420, 347, 430, 433

(56) References Cited

U.S. PATENT DOCUMENTS 5,867,161 * 2/1999 Walsh ..................................... 345/347
5,956,043 * 9/1999 Jensen ................................... 345/430
6,067,086 * 5/2000 Walsh ..................................... 345/347

* cited by examiner

*Primary Examiner*—Mark Zimmerman
*Assistant Examiner*—Cliff N. Vo
(74) *Attorney, Agent, or Firm*—Owen J. Gamon; Roy W. Truelson

(57) ABSTRACT

An editor that edits a tiled image by creating multiple, simultaneously-displayed images on a display screen from a singular source image, which can be a bitmap in memory. The user chooses one of the images on which to draw and draws a change on that image. The editor propagates the user's change to all of the images on the display while the user is drawing the change. The editor displays borders between the multiple images and allows the user to draw across the borders. In this way the user can see the changes on all the images while drawing the change on one image and can easily cause the changes to match precisely across the borders.

42 Claims, 30 Drawing Sheets

TILED IMAGE EDITOR

FIELD OF THE INVENTION

The present invention relates to a method and a system for data processing, and in particular to a data processing system and method for editing a tiled image.

BACKGROUND

A tiled image refers to the process of duplicating a single, small image many times on a computer display screen in order to create a composite, background picture on the display. This creates the impression of a large, singular background without necessitating taking up extra storage space in memory to store the entire background. This background is sometimes called "wallpaper", which takes its name from an analogy to the familiar wallpaper in the home, where the decorator carefully hangs individual strips of wallpaper to make the pattern match across the borders and to form the illusion of a singular pattern.

Just like home decorators would like the images on their wallpaper to match across the borders of the wallpaper strips to hide the seams, creators of tiled images on a display screen would also like the images to match across the borders of the tiles. Unfortunately, these seamless, tiled images can be very difficult to make. Current image editors do not have features that allow artists to easily match up the edges, so artists can spend many hours attempting to create an image that matches on the borders, so that when it is tiled, the seam cannot be seen. An image with perfectly seamless edges requires either a very common and easy pattern on the edges, such as a solid color, or potentially hours of tedious trial and error to get the images on adjacent tiles to match up. Current image editors feature tools and effects—for example, brushes, smudging, shapes, and warps—, which cannot be used across edges because the effect is stopped by the borders of the singular image. This prevents a smooth transition across the border, which is needed to make a seamless tiling.

Thus, there is a need for an image editor that provides that capability to quickly and easily edit an image, so that when the image is tiled the image will match across the borders.

SUMMARY OF THE INVENTION

It is therefore one object of the present invention to provide an improved method and system for data processing.

It is another object of the present invention to provide an improved data-processing system and method for editing an image for use as wallpaper background.

It is another object of the present invention to provide a data-processing system and method for editing an image, so that when the image is tiled the image will match across the borders between the tiles.

These and other objects are accomplished in the preferred embodiment by an editor that edits a tiled image by creating multiple, simultaneously-displayed images on a display screen from a singular source image, which can be a bitmap in memory. The user chooses one of the images on which to draw and draws a change on that image. The editor propagates the user's change to all of the images on the display while the user is drawing the change. The editor optionally displays borders between the multiple images and allows the user to draw across the borders. In this way the user can see the changes on all the images while drawing the change on one image and can easily cause the changes to match precisely across the borders.

DESCRIPTION OF THE PREFERRED EMBODIMENT

Overview

A tiled image refers to the process of duplicating a single, small image many times on a computer display screen in order to create a composite, background picture on the display. This creates the impression of a large, singular background without necessitating taking up extra storage space in memory to store the entire background. This background is sometimes called "wallpaper", which takes its name from an analogy to the familiar wallpaper in the home, where the decorator carefully hangs individual strips of wallpaper to make the pattern match across the borders and to form the illusion of a singular pattern.

Just like home decorators would like the images on their wallpaper to match across the borders of the wallpaper strips to hide the seams, creators of tiled images on a display screen would also like the images to match across the borders of the tiles. Unfortunately, these seamless, tiled images can be very difficult to make. Current image editors do not have features that allow artists to easily match up the edges, so artists can spend many hours attempting to create an image that matches on the borders, so that when it is tiled, the seam cannot be seen. An image with perfectly seamless edges requires either a very common and easy pattern on the edges, such as a solid color, or potentially hours of tedious trial and error to get the images on adjacent tiles to match up. Current image editors feature tools and effects—for example, brushes, smudging, shapes, and warps—, which cannot be used across edges because the effect is stopped by the borders of the singular image. This prevents a smooth transition across the border, which is needed to make a seamless tiling.

In the preferred embodiment, an editor edits a tiled image by creating multiple, simultaneously-displayed images on a display screen from a singular source image, which can be a bitmap in memory. The user chooses one of the images on which to draw and draws a change on that image. The editor propagates the user's change to all of the images on the display while the user is drawing the change. The editor optionally displays borders between the multiple images and allows the user to draw across the borders. In this way the user can see the changes on all the images while drawing the change on one image and can easily cause the changes to match precisely across the borders.

Detailed Description

Figure 1:
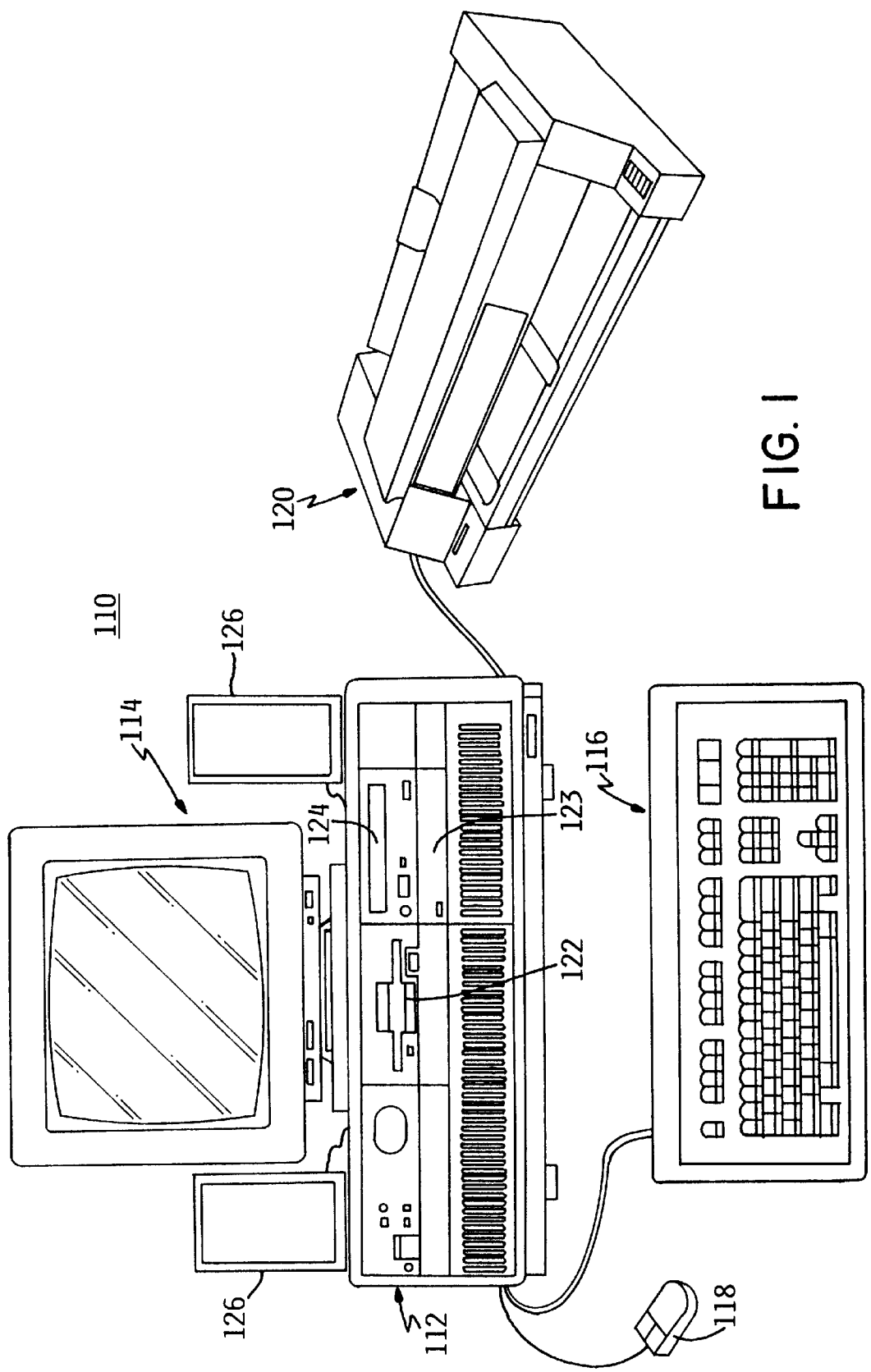
FIG. 1 is a pictorial illustration of a data-processing system that can be utilized to implement the preferred embodiment.

With reference now to the figures and in particular with reference to FIG. 1, there is depicted a pictorial illustration of a data-processing system that may be utilized to implement the preferred embodiment. Data-processing system 110 includes processing unit 112, display device 114, keyboard 116, pointing device 118, printer 120, and speakers 126. Processing unit 112 receives input data from input devices such as keyboard 116, pointing device 118, and local area network interfaces (not illustrated) and presents output data to a user via display device 114, printer 120, and speakers 126. Pointing device 118 is preferably utilized in conjunction with a graphical user interface (GUI) in which hardware components and software objects are controlled through the selection and the manipulation of associated graphical objects displayed within display device 114. Although data-processing system 110 is illustrated with a mouse for pointing device 118, other graphical-pointing devices such as a graphic tablet, joystick, track ball, or track pad could also be utilized.

To support storage and retrieval of data, processing unit 112 further includes diskette drive 122, hard-disk drive 123, and CD-ROM drive 124, which are interconnected with other components of processing unit 112. While a particular hardware configuration is described herein along with various alternatives, the methods described could in general be practiced using any hardware configuration that allows the editing and display of tiled images.

Figure 2:
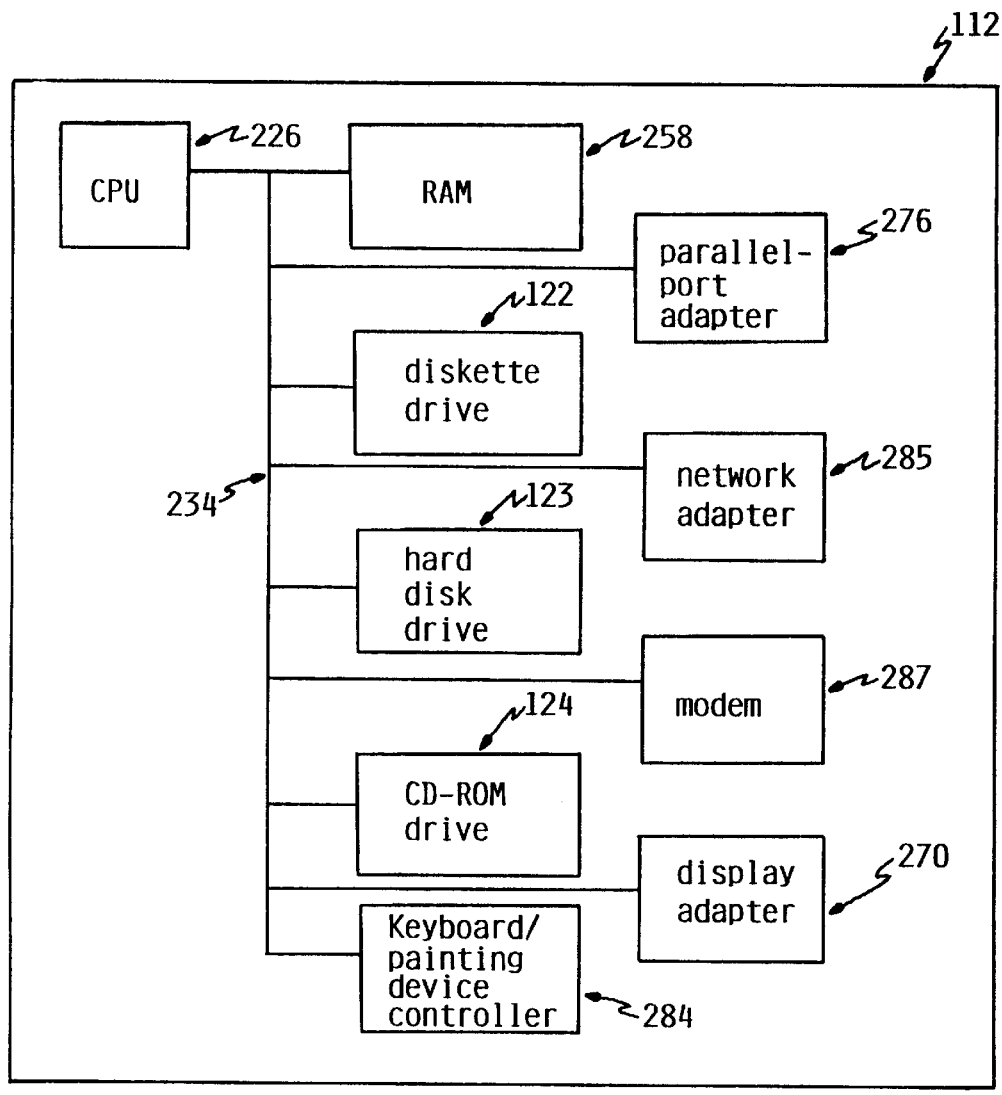
FIG. 2 is a more detailed block diagram representation of the processing unit of the data-processing system shown in FIG. 1.

Referring to FIG. 2, there is depicted a block diagram of the principal components of processing unit 112. CPU 226 is connected via system bus 234 to RAM 258, diskette drive 122, hard-disk drive 123, CD-ROM drive 124, keyboard/pointing-device controller 284, parallel-port adapter 276, network adapter 285, display adapter 270 and modem 287. Although the various components of FIG. 2 are drawn as single entities, each may consist of a plurality of entities and may exist at multiple levels.

Processing unit 112 includes a central processing unit (CPU) 226, which executes software instructions. While any appropriate processor can be utilized for CPU 226, CPU 226 is preferably one of the Power PC line of microprocessors available from IBM. Alternatively, CPU 226 can be implemented as one of the 80×86 or Pentium processors, or any other type of processor, which are available from a number of vendors. CPU 226 accesses data and instructions from and stores data to volatile random access memory (RAM) 258.

RAM 258 comprises a number of individual volatile memory modules that store segments of operating systems and application software while power is supplied to data-processing system 110. The software segments are partitioned into one or more virtual memory pages that each contain a uniform number or virtual memory addresses. When the execution of software requires more pages of virtual memory that can be stored within RAM 258, pages that are not currently needed are swapped with the required pages, which are stored within non-volatile storage devices 122 or 123.

Keyboard/pointing-device controller 284 interfaces processing unit 112 with keyboard 116 and graphical-pointing device 118. In an alternative embodiment, there could be a separate controller for keyboard 116 and graphical-pointing device 118.

Display adapter 270 translates graphics data from CPU 226 into video signals utilized to drive display device 114.

Finally, processing unit 112 includes network-adapter 285, modem 287, and parallel-port adapter 276, which facilitate communication between data-processing system 110 and peripheral devices or other data processing systems. Network-adapter 285 connects data-processing system 110 to an unillustrated local area network (LAN). A LAN provides a user of data-processing system 110 with a means of electronically communicating information, including software, with a remote computer or a network logical-storage device. In addition, a LAN supports distributed processing, which enables data processing system 110 to share a task with other data processing systems linked to the LAN.

Modem 287 supports communication between data-processing system 110 and another data-processing system over a standard telephone line. For example, modem 287 may be utilized to connect data-processing system 110 to an on-line information service, such as provided by Prodigy Services Corporation under the service mark "PRODIGY." Such an on-line service provides software that can be downloaded into data-processing system 110 via modem 287. Furthermore, through modem 287, data-processing system 110 can access other systems such as a server, a client, an electronic bulletin board, and the Internet or World Wide Web.

Parallel-port adapter 276 transmits printer-control signals to printer 120 through a parallel port.

As will be described in detail below, aspects of the preferred embodiment pertain to specific method steps implementable on computer systems. In an alternative embodiment, the invention may be implemented as a computer program-product for use with a computer system. The programs defining the functions of the present invention can be delivered to a computer via a variety of signal-bearing media, which include, but are not limited to, (a) information permanently stored on non-writable storage media (e.g., read only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the method functions of the present invention, represent alternative embodiments of the present invention.

Figure 3:
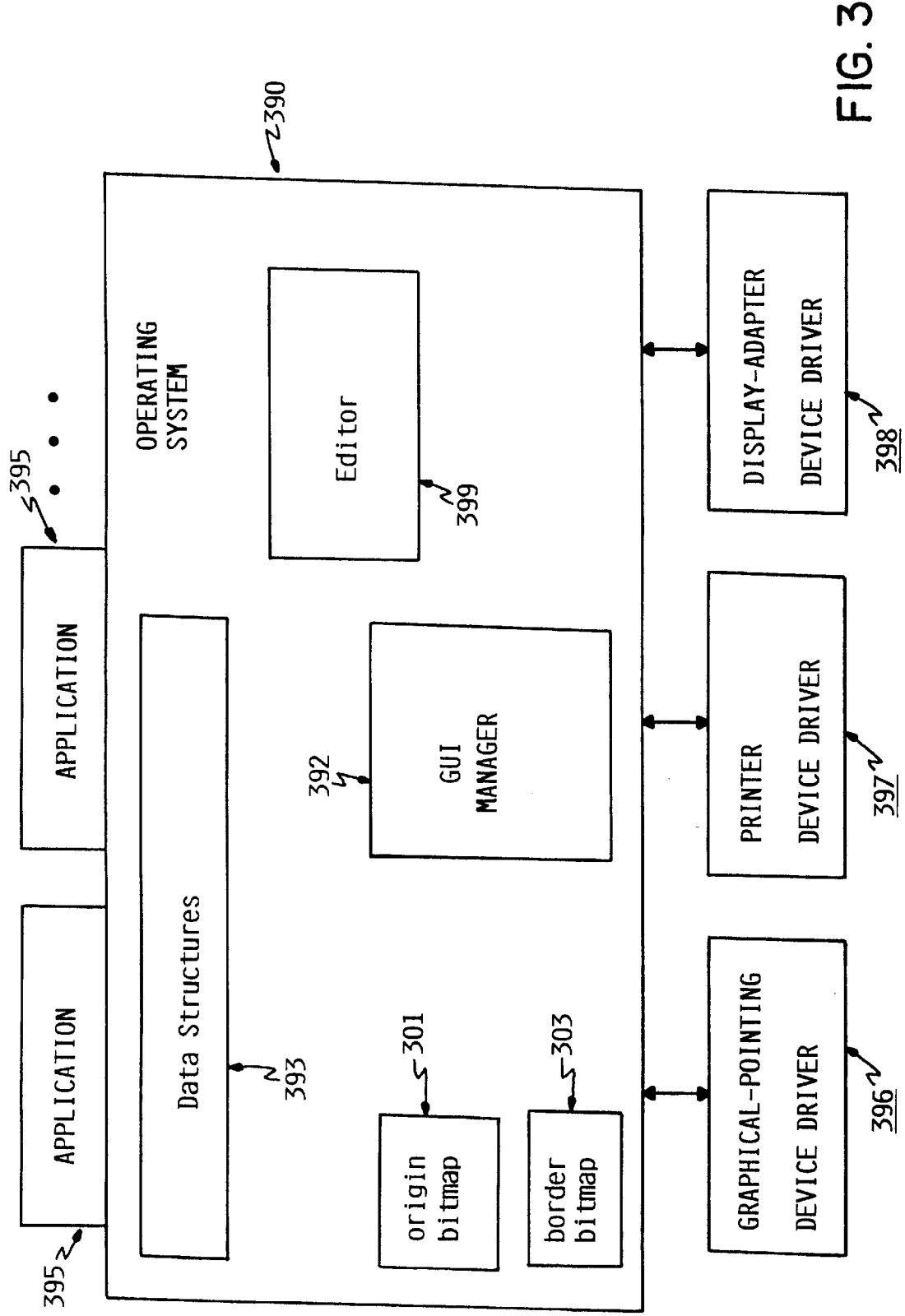
FIG. 3 is a block diagram representation of an editor and other software stored within the memory of the data-processing system depicted in FIG. 1.

With reference now to FIG. 3, there is illustrated a block-diagram representation of the software configuration of data-processing system 110 in accordance with the preferred embodiment. As noted above, the software executed by data-processing system 110 can be stored within one or more of RAM 258, the nonvolatile storage provided by diskette drive 122, hard-disk drive 123, CD-ROM drive 124, or a remote server accessible via modem 287 or network-adapter 285.

As illustrated, the software configuration of data-processing system 110 includes operating system (OS) 390, which is responsible for managing the allocation uses of data-processing system 110, for example, by assigning CPU time to various execution threads and allocating portions of RAM 258 for use by various user applications 395. In accordance with the preferred embodiment, OS 390 includes graphical-user-interface (GUI) 392 manager, editor 399, origin bitmap 301, border bitmap 303, and data structures 393.

Although the various components of operating system 390 are shown as being separate entities, they could in fact be packaged as one entity. In addition, GUI 392, editor 399, origin bitmap 301, border bitmap 303, and data structures 393 could be packaged separately from OS 390.

GUI 392 manages the graphical-user-interface with which a user of data-processing system 110 interacts. Editor 399 manages the editing of origin bitmap 301, border bitmap 303, and the display of the bitmaps as images on display device 114. The operation of editor 399 is further described under the description for FIGS. 10–16, below. Origin bitmap 301 and border bitmap 303 are the source of the tiled images displayed on display device 114 and are further described under the description for FIG. 4, FIG. 5a, and FIG. 5b.

Referring again to FIG. 3, OS 390 communicates with applications 395 through messages conforming to the syntax of the application program interface (API) supported by OS 390. OS 390 further communicates with graphical-pointing device-driver 396 and display-adapter device-driver 398. For example, OS 390 sends graphics data that specify display parameters in context to display-adapter device-driver 398, which in turn translates the messages into bus signals utilized to control display-adapter 270. In addition, graphical-pointing device-driver 396 translates signals from pointing device 118 through keyboard/pointing-device controller 284 into Cartesian coordinates and a selection status, which are then relayed to GUI manager 392.

CPU 226 is suitably programmed to carry out the preferred embodiment by GUI manager 392 and editor 399, as described in more detail in the flowcharts of FIGS. 10–16. In the alternative, the function of FIGS. 10–16 could be implemented by control circuitry through the use of logic gates, programmable-logic devices, or other hardware components in lieu of a processor-based system.

Figure 4:
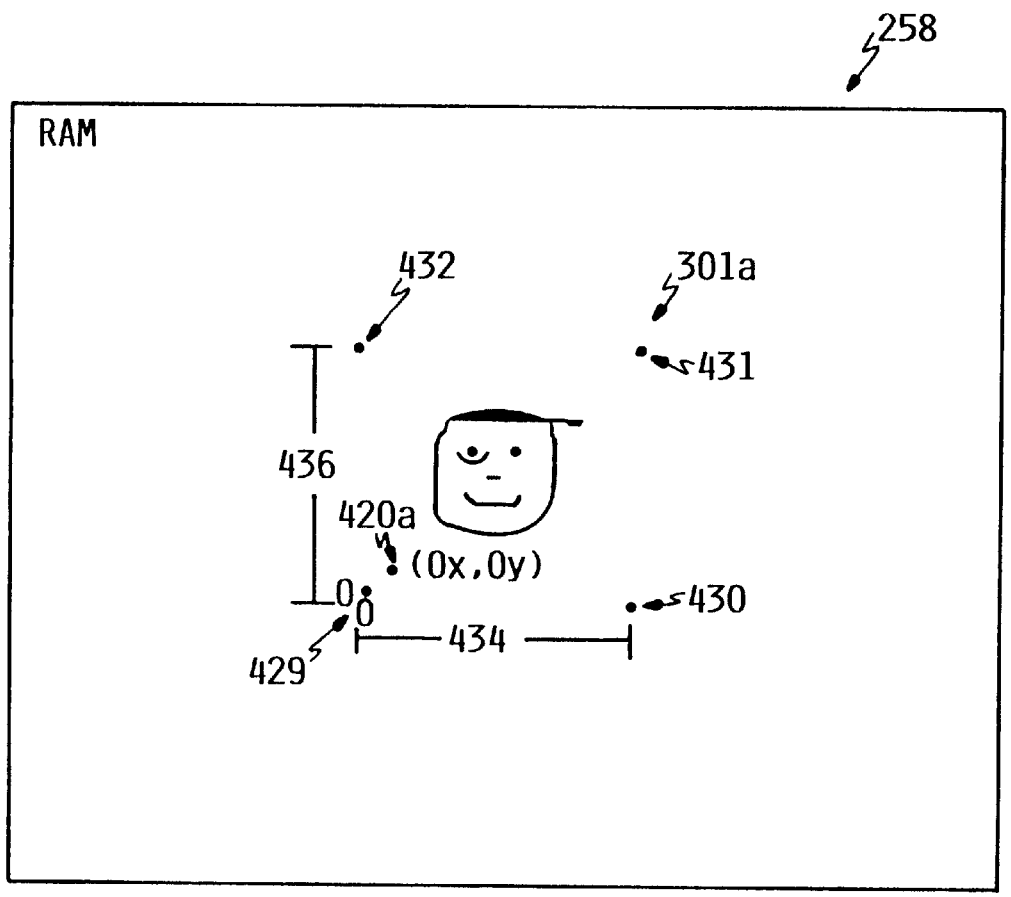
FIG. 4 is a pictorial illustration of an example origin bitmap in the preferred embodiment.

FIG. 4 illustrates a pictorial representation of origin bitmap 301a in RAM 258. Origin bitmap 301a is an instance of origin bitmap 301 shown in FIG. 3. A bitmap is a section of memory that maps a bit or bits to pixels on a display. Thus, for example, if a bit is "on" in memory, that means that when the bit pattern is written to display 114, the corresponding pixel will have a video effect. When multiple bits are used to represent a pixel, colors, intensities, and brightness can also be specified by the bitmap. In the example shown in FIG. 4, the bits in bitmap 301a are set so that when bitmap 301a is written to display 114, a smiling face with a baseball cap will be shown. One of the bits in origin bitmap 301a is origin point 420a, which has coordinates (Ox,Oy). Point 420a will be further described under the description for FIG. 6b, below.

Origin bitmap 301a is addressed in a Cartesian coordinate system with point 429 having coordinates (0,0) being at the lower left-hand corner, point 430 with coordinates (bitmap_x_max,0) being at the lower right-hand corner, point 431 with coordinates (bitmap_x_max, bitmap_y_max) being at the upper right-hand corner, and point 432 having coordinates (0,bitmap_y_max) being at the upper left-hand corner. The maximum x-axis coordinate for bitmap 301a is bitmap_x_max, and the maximum y-axis coordinate for bitmap 301a is bitmap_y_max. The width of bitmap 301a is bitmap_x_width 434, and the height of bitmap 301a is bitmap_y_height 436. Since in the preferred embodiment the Cartesian coordinate system starts with zero, bitmap_x_max=bitmap_x_width−1 and bitmap_y_max=bitmap_y_height−1.

Figure 5A:
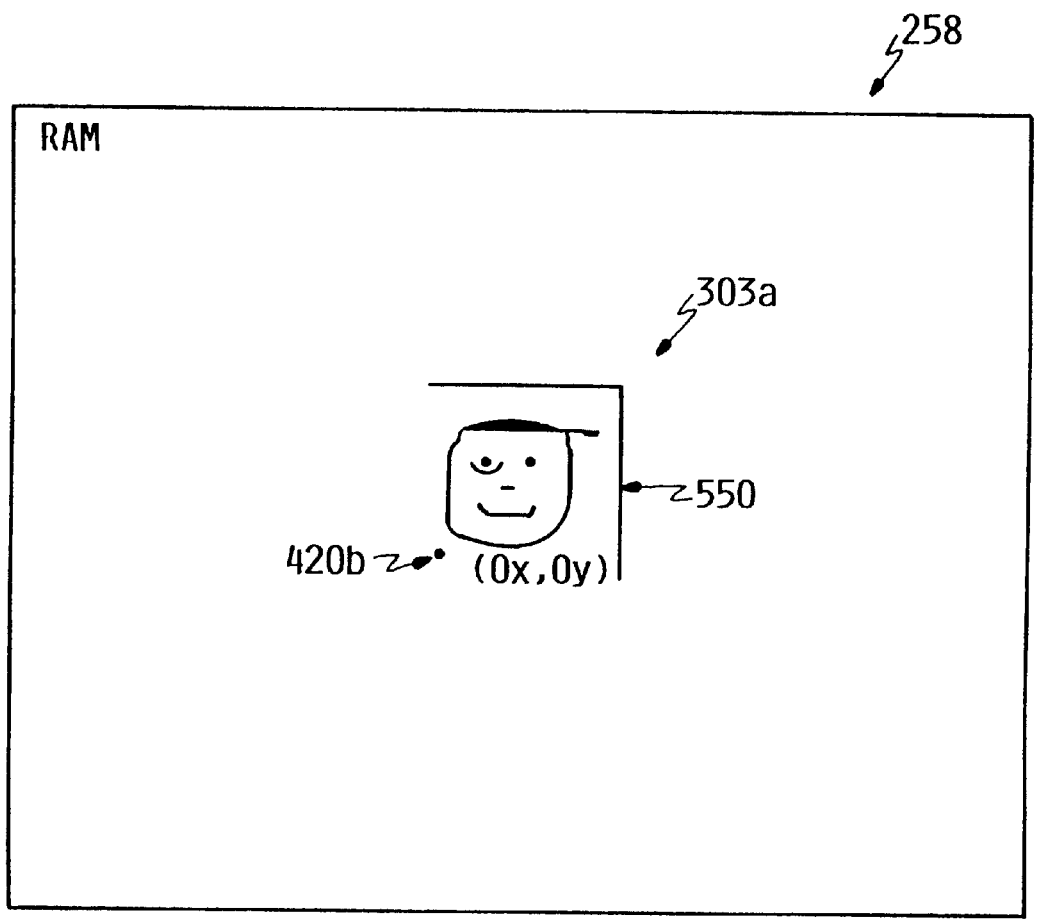
FIG. 5a is a pictorial illustration of an example bitmap with a rectangular border, in the preferred embodiment.

FIG. 5a illustrates a pictorial representation of border bitmap 303a with border 550 in the shape of a half-rectangle in memory, in the preferred embodiment. Border bitmap 303a contains origin point 420b, which has coordinates (Ox,Oy). Point 420b will be further described under the description for FIG. 6, below. Border bitmap 303a is an instance of border bitmap 303 shown in FIG. 3. The same coordinate system that was used for origin bitmap 301a in FIG. 4 is also used for border bitmap 303a in FIG. 5a.

Figure 5B:
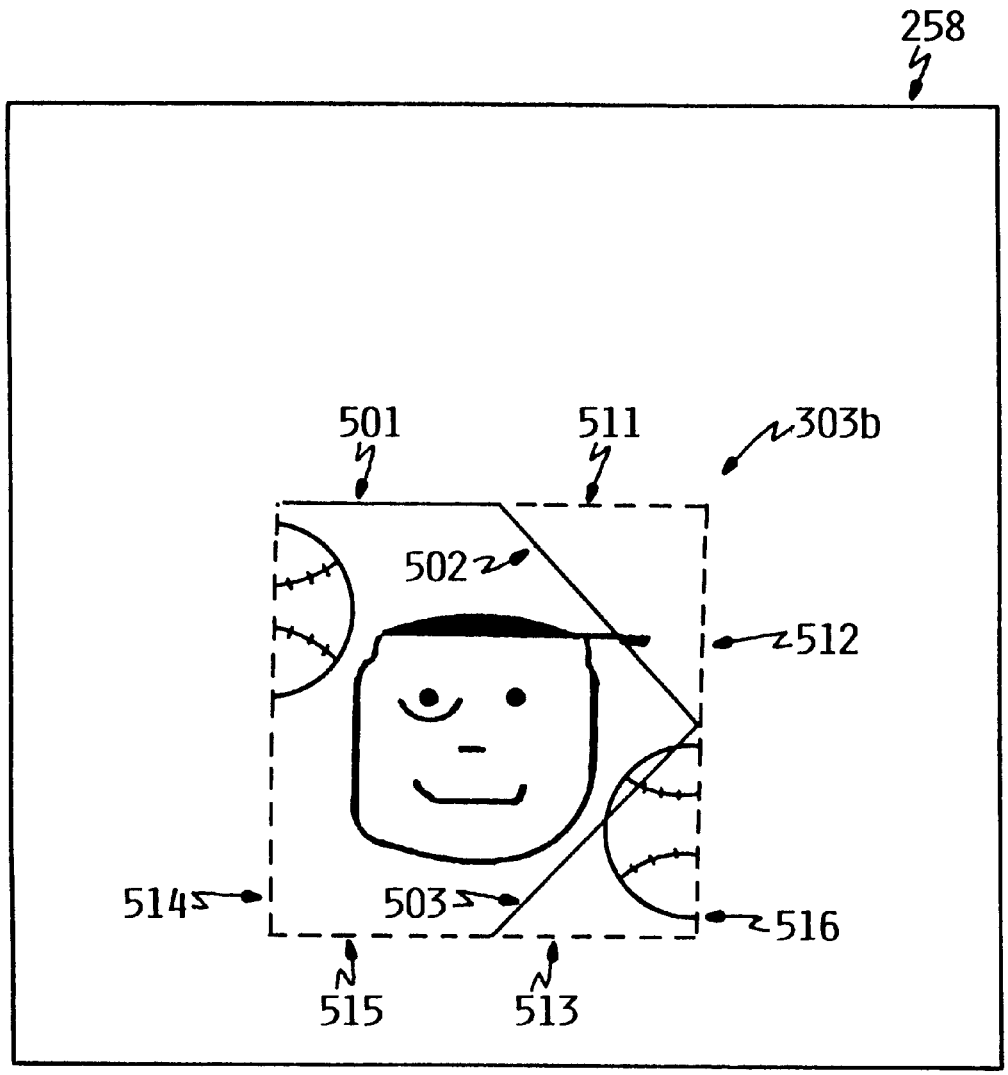
FIG. 5b is a pictorial illustration of an example bitmap with a hexagonal border, in an alternative embodiment.

FIG. 5b illustrates a pictorial representation of border bitmap 303b with a hexagonal border in memory, in an alternative embodiment. Border bitmap 303b is an instance of border bitmap 303 shown in FIG. 3. The same coordinate system that was used in FIG. 4 and FIG. 5a is also used in FIG. 5b. Solid lines 501, 502, and 503 are the border while dashed lines 511, 512, 513, 514, 515, and 516 indicate the physical perimeter of bitmap 303b. Dashed lines 511, 512, 513, 514, 515, and 516 are not represented by bits in memory 258, but are instead illustrated in FIG. 5b simply to show the relationship of border bitmap 303b to FIG. 9. This can be further understood by examining the tiled display of FIG. 9 where it can be observed that border bitmap 303b contains portions of three different hexagonals. The region bounded by dashed lines 511, 512 and solid line 502 will become a portion of one hexagonal shape in FIG. 9. The region bounded by solid line 503 and dashed lines 513, 516 will form a portion of a second hexagonal in FIG. 9. The remaining region of border bitmap 303b, that is, the region bounded by solid lines 501, 502, 503 and dashed lines 514 and 515 will become a portion of a third hexagonal in FIG. 9. The purpose of the borders in FIG. 5a and FIG. 5b is to aid the user in creating a symmetrical drawing when the bitmaps are displayed on display 114.

Although rectangles and hexagonals are shown, other geometric shapes are possible, for example triangles or other polygons.

Figure 6A:
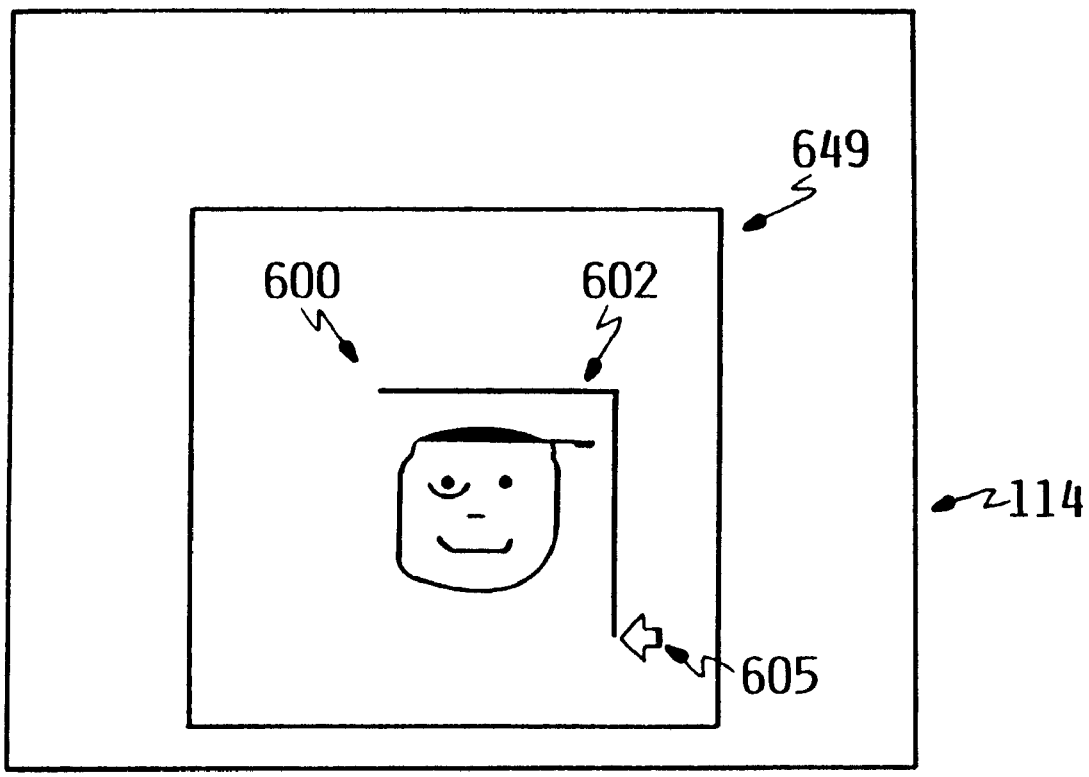
FIGS. 6a, 6b, 6c, 6d, 6e, 6f, and 6g are pictorial illustrations of example screen images during operation of the preferred embodiment.

FIGS. 6a–6g illustrate a series of displayed images during operation of the preferred embodiment. Referring to FIG. 6a, a user has drawn origin-image 600 having border 602 in window 649 on display screen 114 via editor 399, GUI 392, pointing device 118, and pointing-device pointer 605. In response to this drawing, in this example editor 399 created origin bitmap 301a and border bitmap 303a.

Figure 6B:
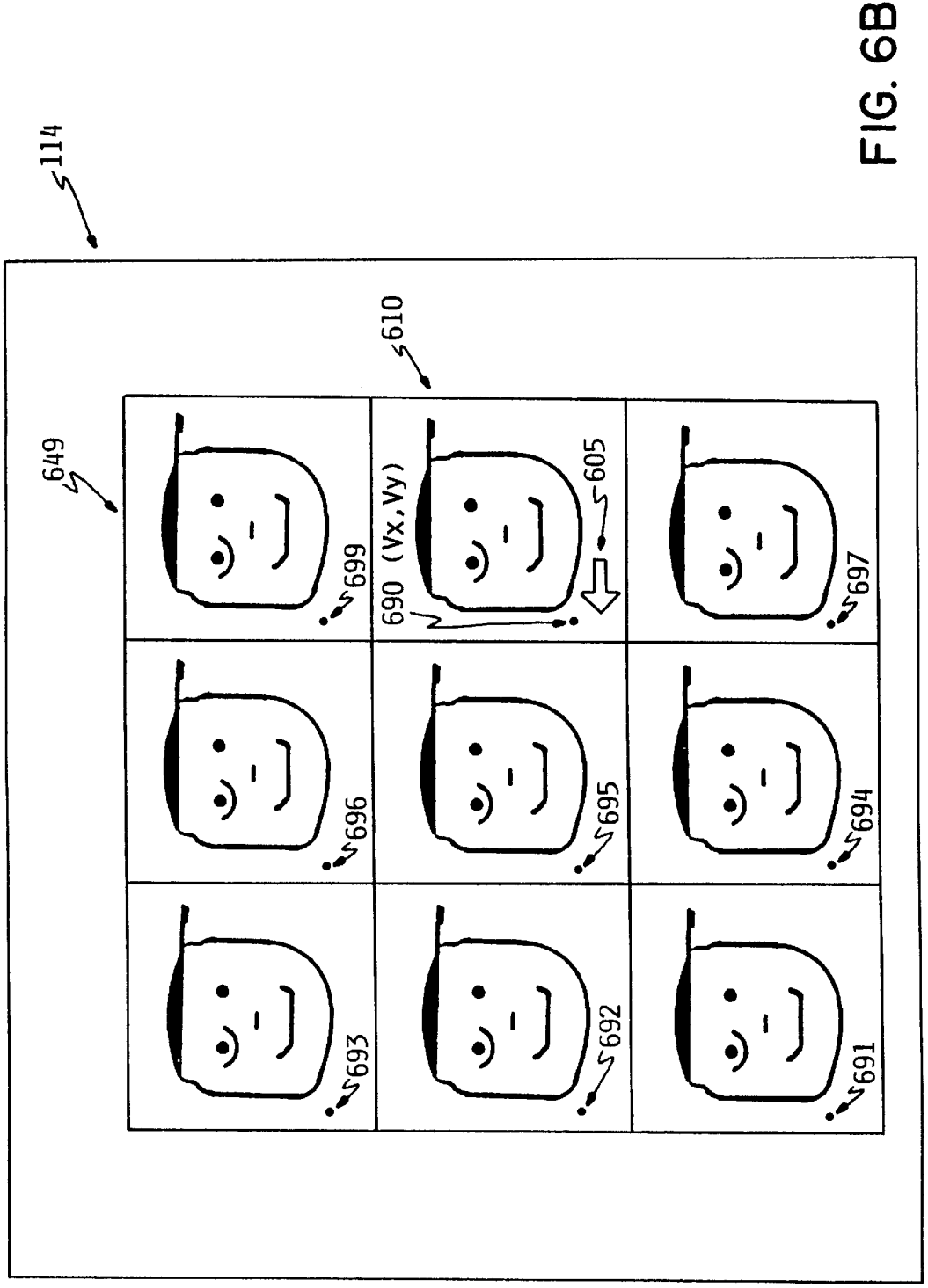

Referring to FIG. 6b, editor 399 has propagated (tiled) origin-image 600 in window 649 on display screen 114 to create nine, simultaneously-displayed images. Each image has border 602 propagated with it. The user has decided to make a change to the tiled display, and has selected image 610 on which to draw the change by positioning pointing-device pointer 605 within image 610. The user has begun drawing on image 610 by drawing a dot at point 690, which has coordinates (Vx,Vy). The coordinates (Vx,Vy) are in relation to window 649. In response to this drawing change, editor 399 has translated this change to point 420a with coordinates (Ox,Oy) in bitmap 301*a* and point 420*b* with coordinates (Ox,Oy) in border bitmap 303*a*. Editor 399 then propagated this change to points 691, 692, 693, 694, 695, 696, 697, 690, and 699.

Figure 6C:
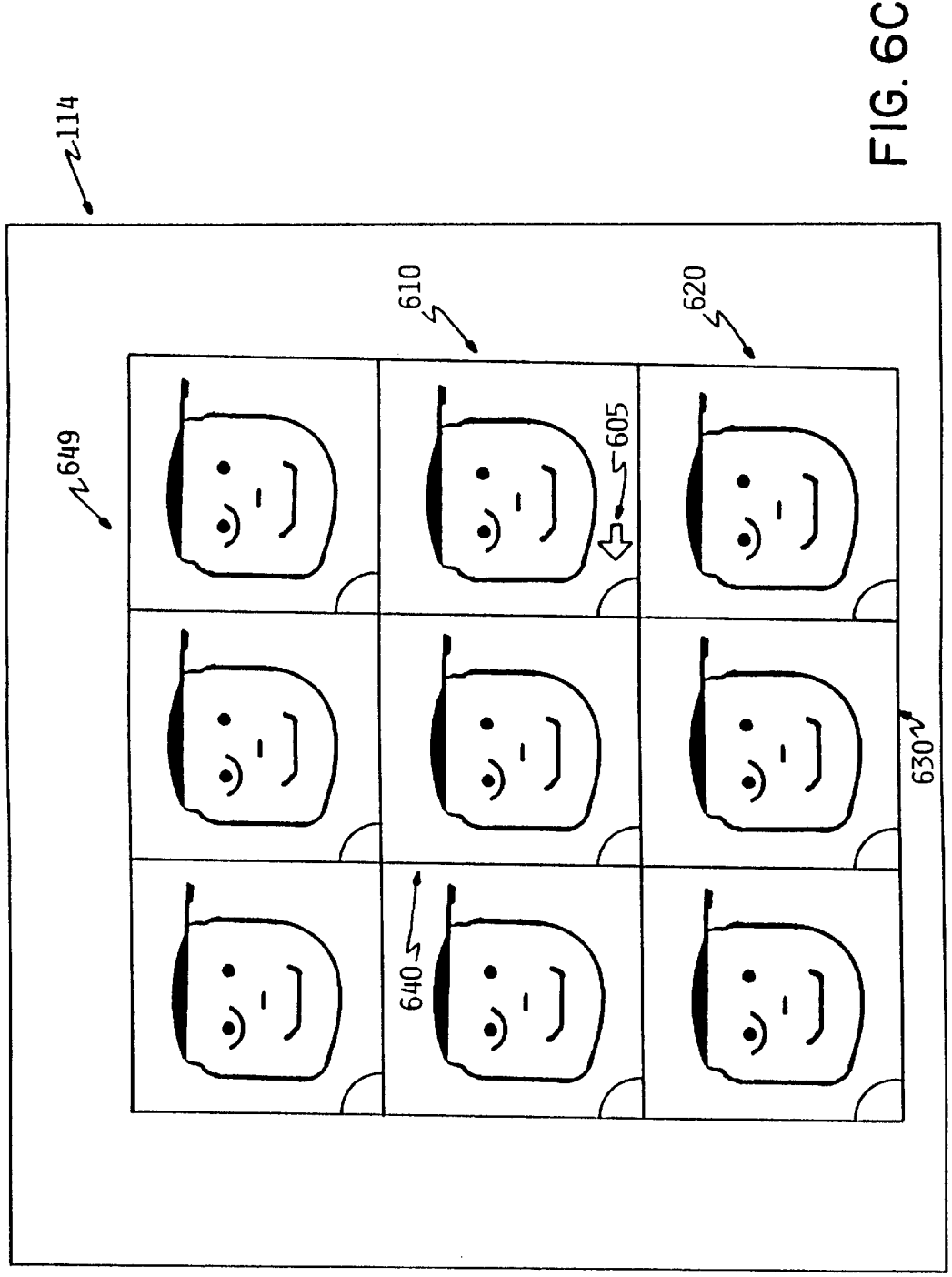

Referring to FIG. 6*c*, the user has continued by drawing a curved line in image 610 using editor 399 and pointing-device pointer 605. In response to this change to image 610, editor 399 translated this change to origin bitmap 301*a*, border bitmap 303*a*, and propagated the change to all the images in window 649 on display screen 114. For example, editor 399 propagated the same curved line to the lower left-hand corner of images 620, 630, and 640. In this way, editor 399 shows to the user the changes in all the images as the user draws changes in one image. In the preferred embodiment, editor 399 propagates the changes one pixel at a time; but, in an alternative embodiment editor 399 could wait until multiple pixels are drawn before propagating their changes.

Figure 6D:
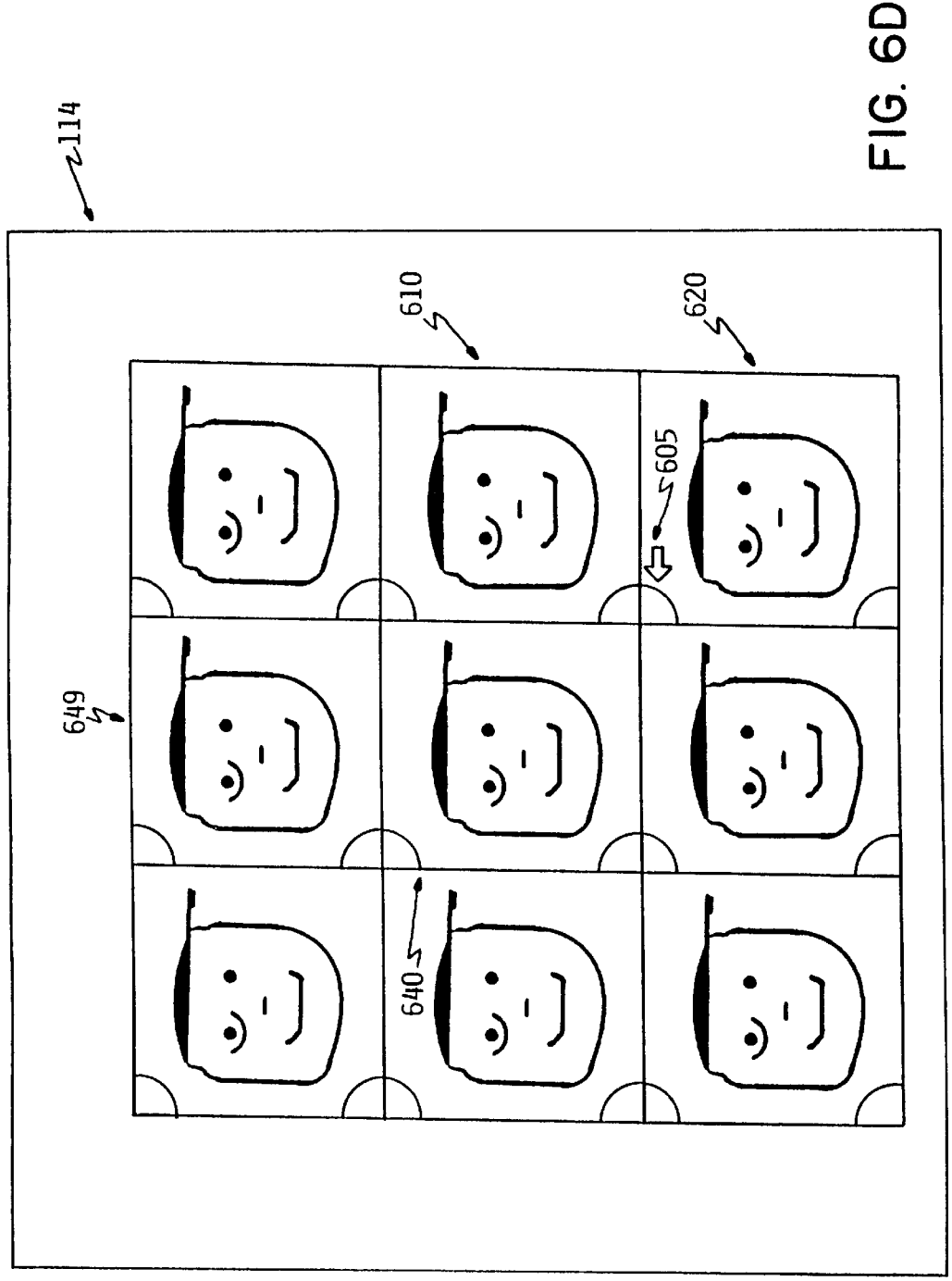

Referring to FIG. 6*d*, the user continued to extend the line that the user started in FIG. 6*b*, by drawing a curved line using pointing-device pointer 605 in the upper left-hand corner of image 620. In response to this change, editor 399 translated this change to origin bitmap 301*a*, border bitmap 303*a*, and propagated the curved line in the upper left-hand corner to all the images in window 649 on display screen 114. Notice that it is very easy for the user to make the curved lines in images 610 and 620 match across their adjacent borders because both images are displayed on the screen at the same time. Further, editor 399 ensures that the images match across all the other borders, for example the borders between images 620 and 630, and the transition from one border to another is transparent to the user; the user just draws a line across the border and editor 399 does the rest.

Figure 6E:
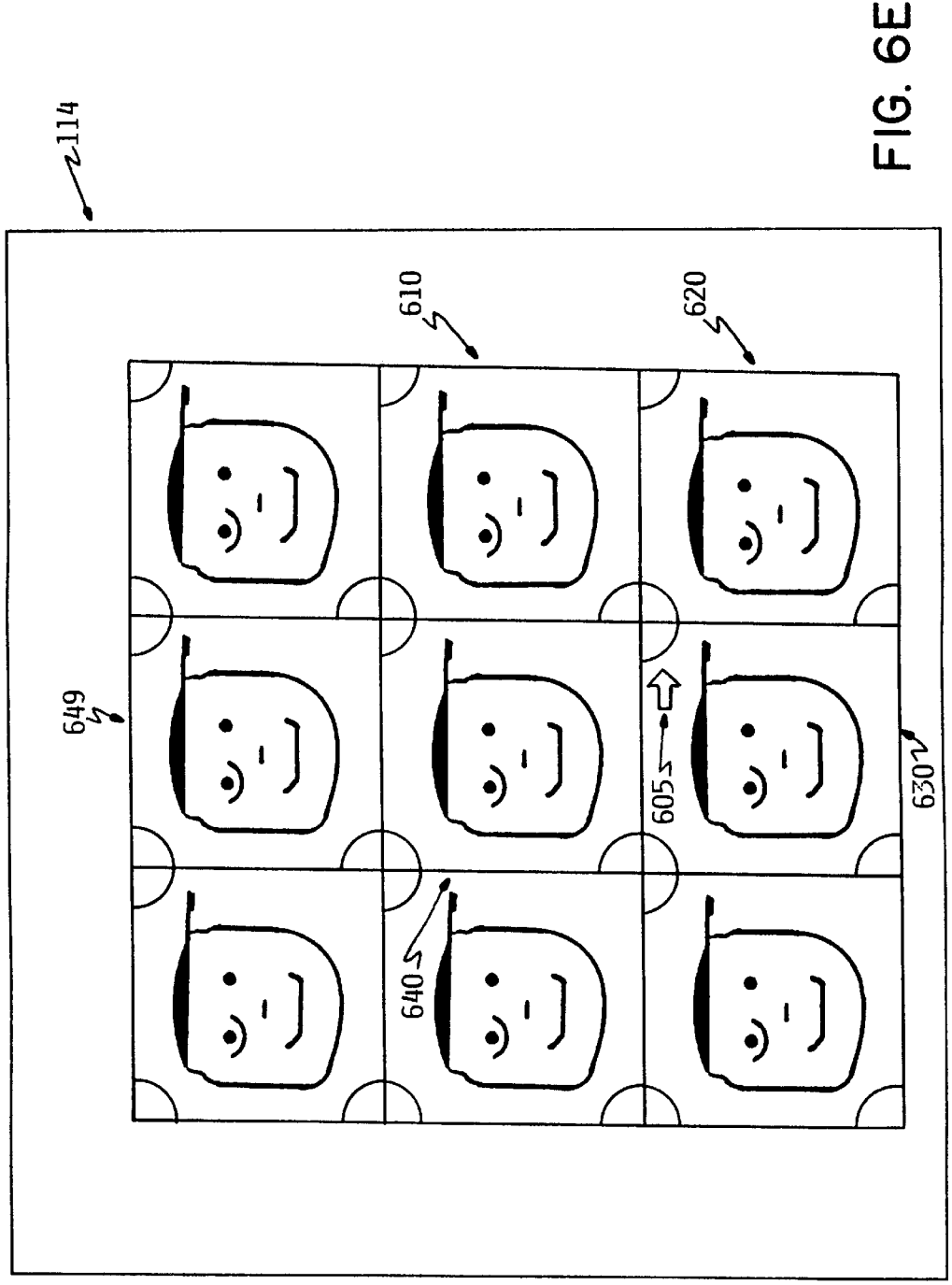

Referring to FIG. 6*e*, the user continued to draw a curved line using pointing device pointer 605; this time the line is in image 630 in the upper right-hand corner. In response to this change, editor 399 translated this change to origin bitmap 301*a*, border bitmap 303*a*, and propagated the curved line in the upper right-hand corner to all the images, for example, images 610, 620, and 640.

Figure 6F:
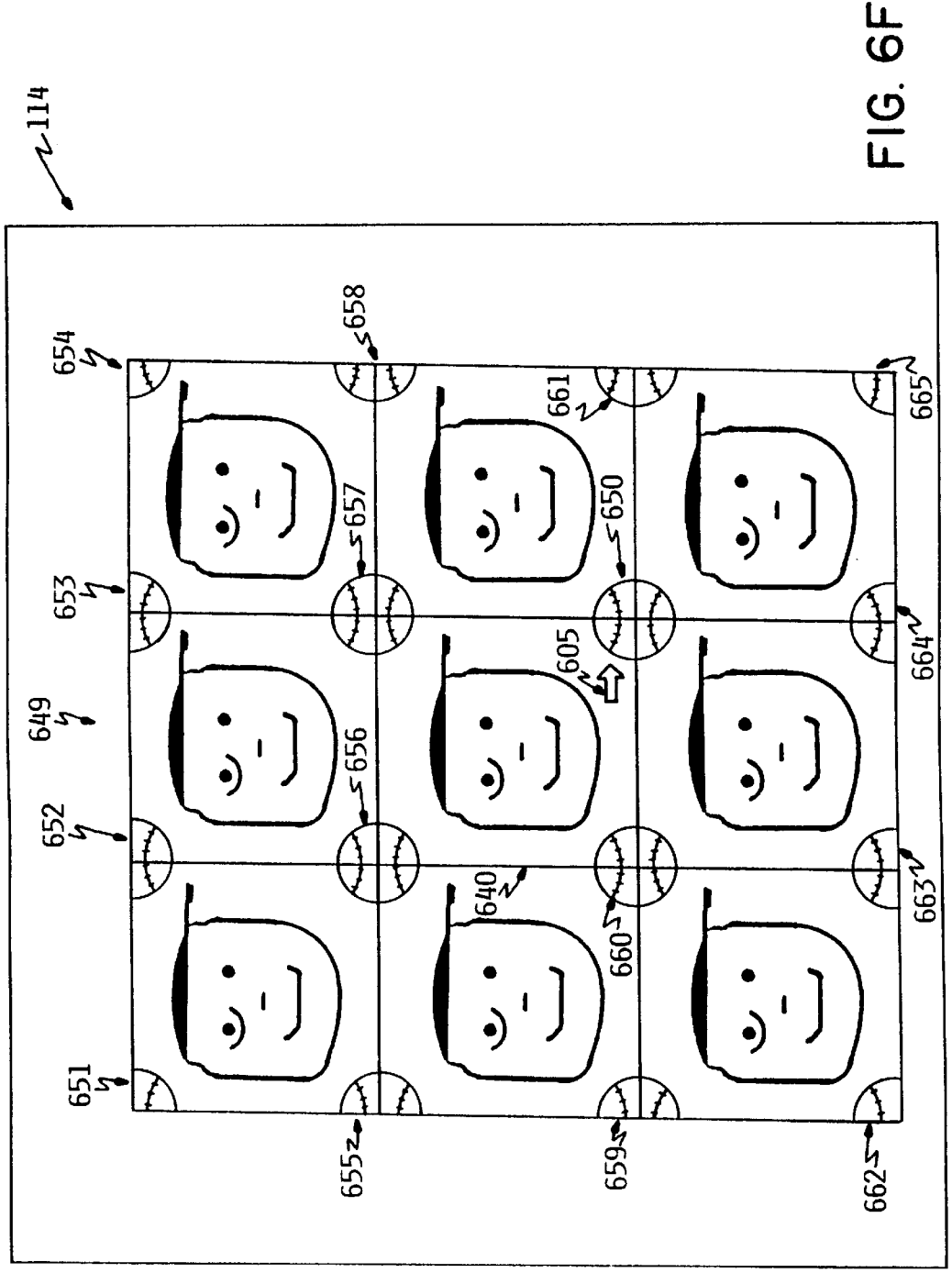

Referring to FIG. 6*f*, the user continued to draw a curved line into image 640 in the lower right-hand corner using pointing-device pointer 605. In response to this change, editor 399 translated this change to origin bitmap 301*a*, border bitmap 303*a*, and propagated the curved line in the lower right-hand corner to all the images. In similar fashion, the user continues to draw baseball 650, using editor 399 and pointing-device pointer 605, and editor 399 propagated baseball 650 to baseballs 651–665 in window 649 on display screen 114. Notice that the baseballs cross the borders between the images.

Figure 6G:
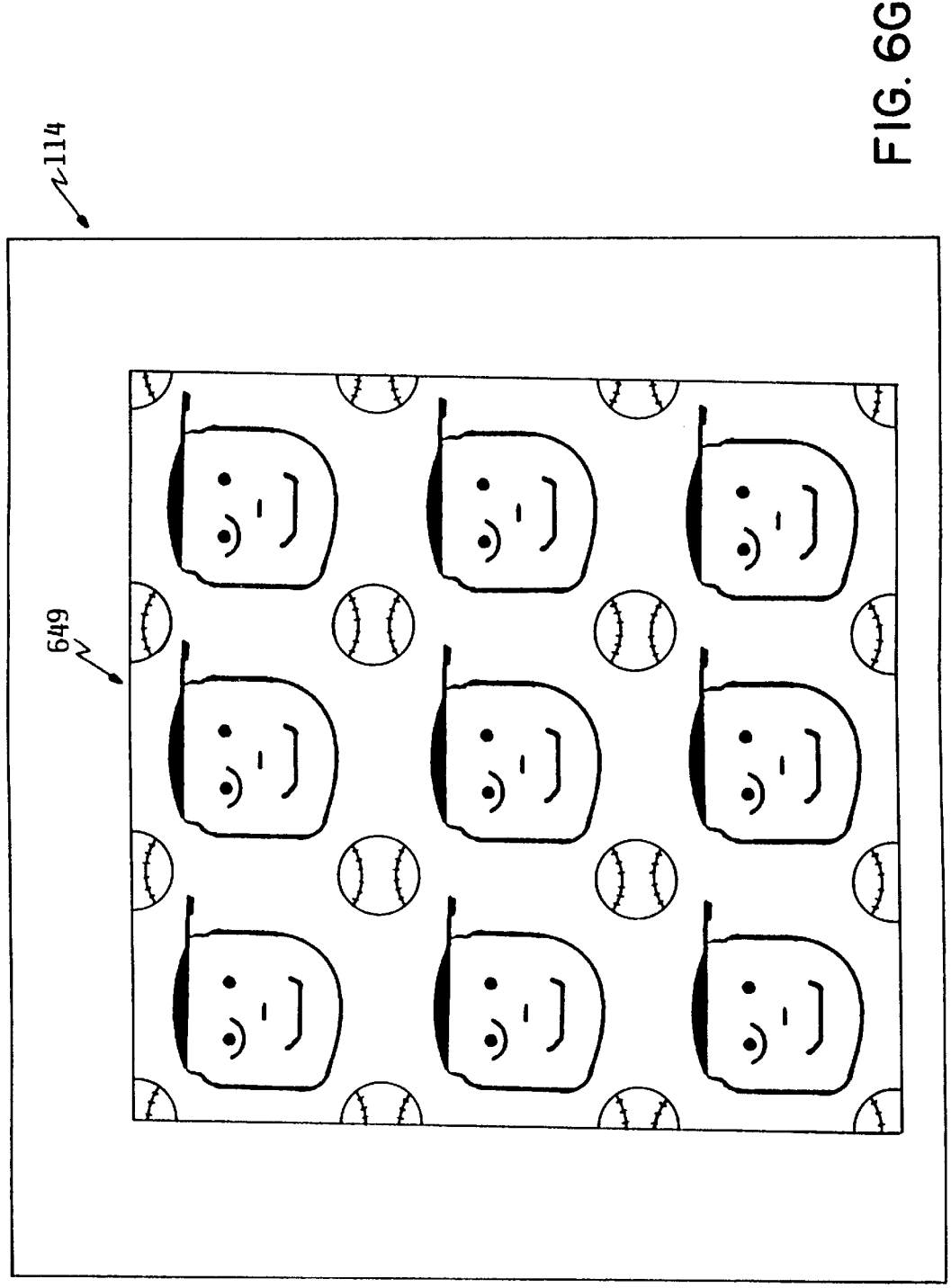

Referring to FIG. 6*g*, editor 399 has removed the borders between the multiple, simultaneously displayed images in window 649 on display 114. FIG. 6*g* thus represents an example of the final background, tiled image after operation of the preferred embodiment. In an alternative embodiment, editor 399 could operate in a borderless mode entirely. Note that the line around the circumference of window 649 does not represent borders around the images, but instead represents the delineation of window 649 from the rest of display screen 114.

Figure 7A:
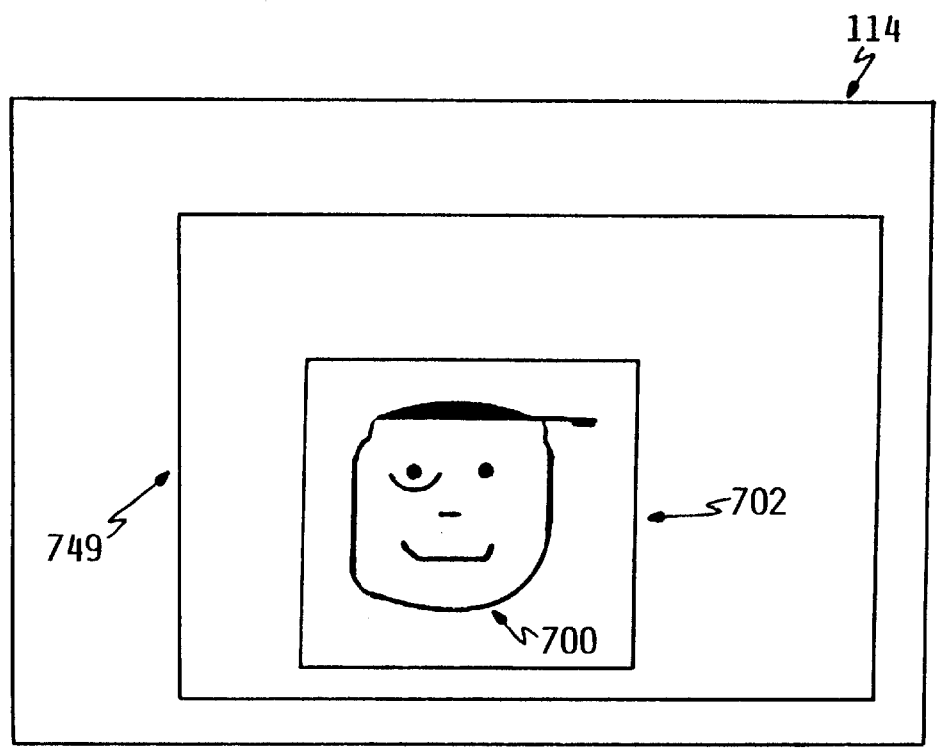
FIGS. 7a, 7b, 7c, 7d, 7e, and 7f are pictorial illustrations of example screen images during operation of an alternative embodiment.
Figure 7B:
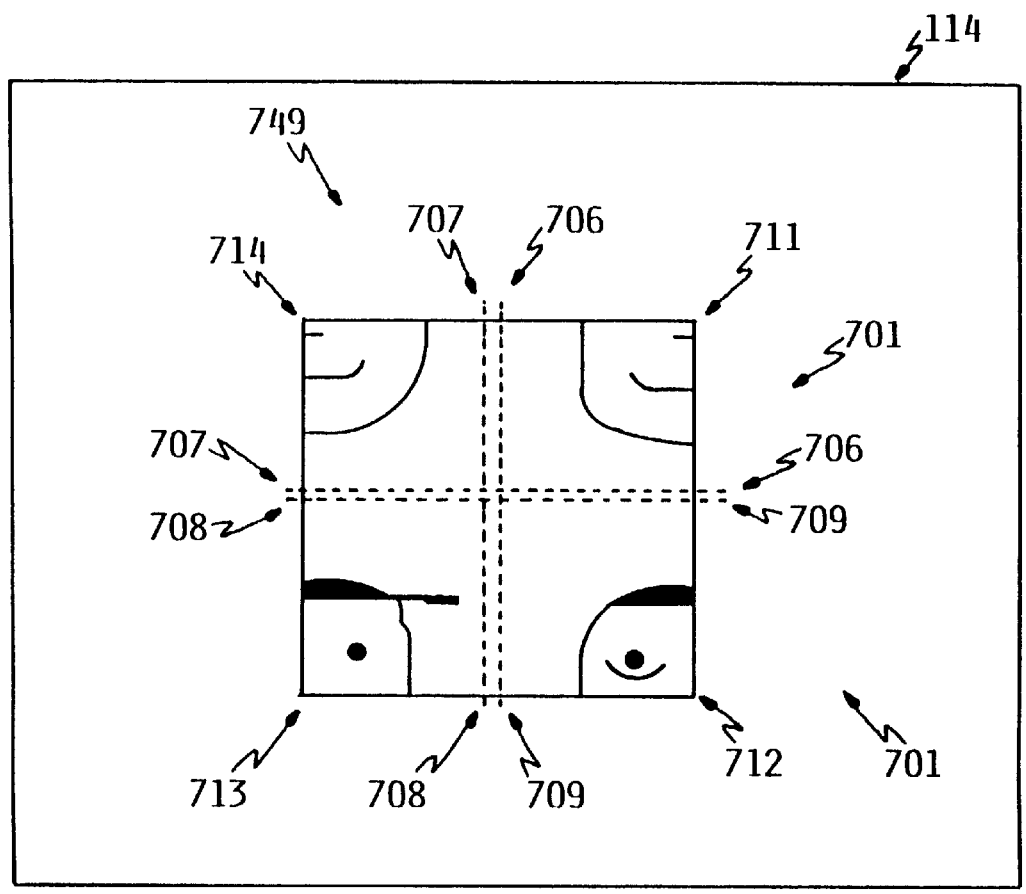

FIGS. 7*a*–7*f* illustrate examples of the creation of tiled images in an alternative embodiment. Referring to FIG. 7*a*, editor 399 has displayed origin-image 700 having border 702 around its circumference in window 749 on display screen 114; thus, border 702 is represented in the bounding pixels of origin-image 700. Referring to FIG. 7*b*, editor 399 has split origin-image 600 on display 114 into four portions: portion 711, portion 712, portion 713, and portion 714. Portion 711 was originally the lower left-hand quadrant of origin-image 600. Portion 712 was originally the upper left-hand quadrant of origin-image 600. Portion 713 was originally the upper right-hand quadrant of origin-image 600. Portion 714 was originally the lower right-hand quadrant of origin-image 600. Portion 711 includes border section 706, portion 712 includes border section 709, portion 713 includes border section 708, and portion 714 includes border section 707. Border sections 706, 707, 708, and 709 are each one-fourth of original border 602 and each form a right angle.

Editor 399 has rearranged the four portions of the original image into split image 701, so that the border sections of each portion are adjacent and parallel to the border sections of another portion. Portion 711 is now the upper right-hand quadrant of split image 701. Portion 712 is now the lower right-hand quadrant of split image 701. Portion 713 is now the lower left-hand corner of split image 701. Portion 714 is now the upper left-hand quadrant of split image 701.

Figure 7C:
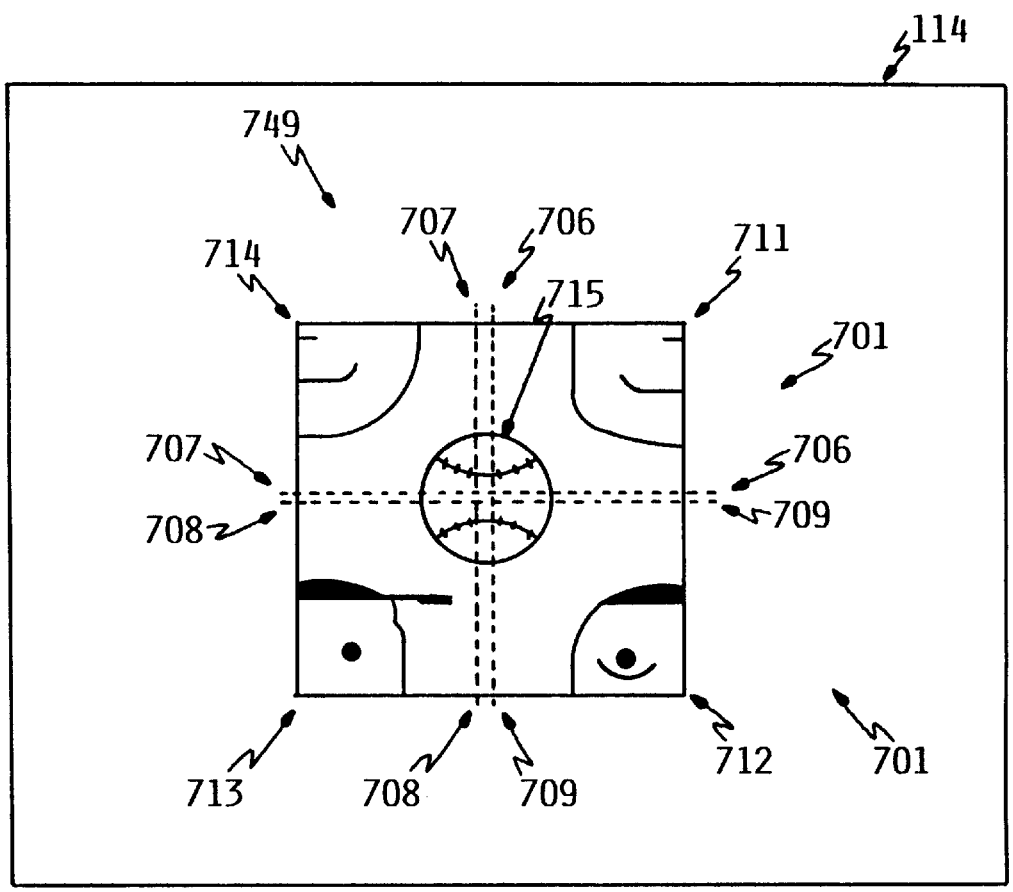

Referring to FIG. 7*c*, the user has used editor 399 and pointing-device 118 to draw baseball 715, which covers a part of all portions 711, 712, 713, and 714, and also crosses all borders 706, 707, 708, and 709. Each border is crossed twice by baseball 715.

Figure 7D:
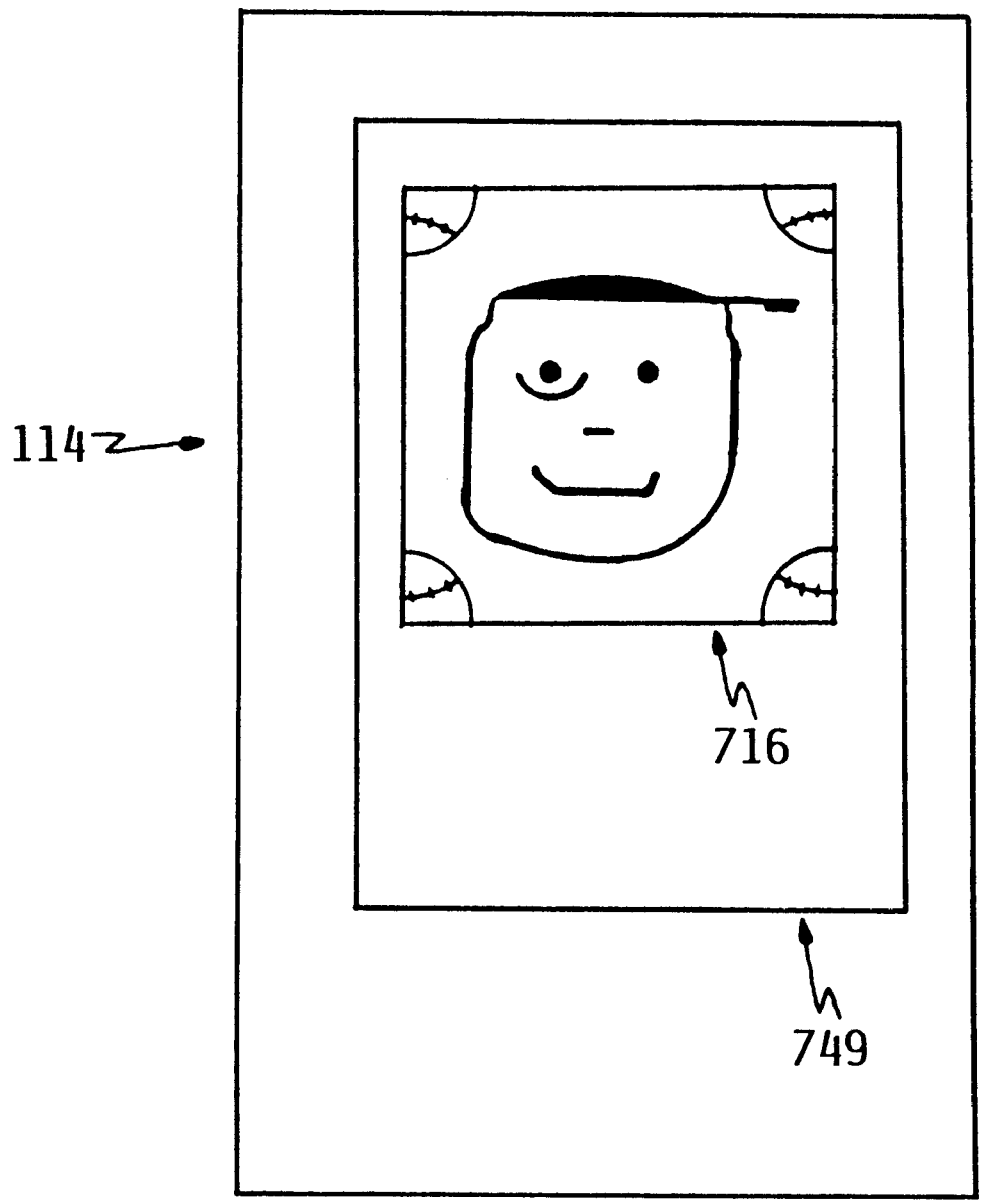

Referring to FIG. 7*d*, editor 399 has reassembled the four portions 711, 712, 713, and 714, into image 716 in window 749 on display screen 114.

Figure 7E:
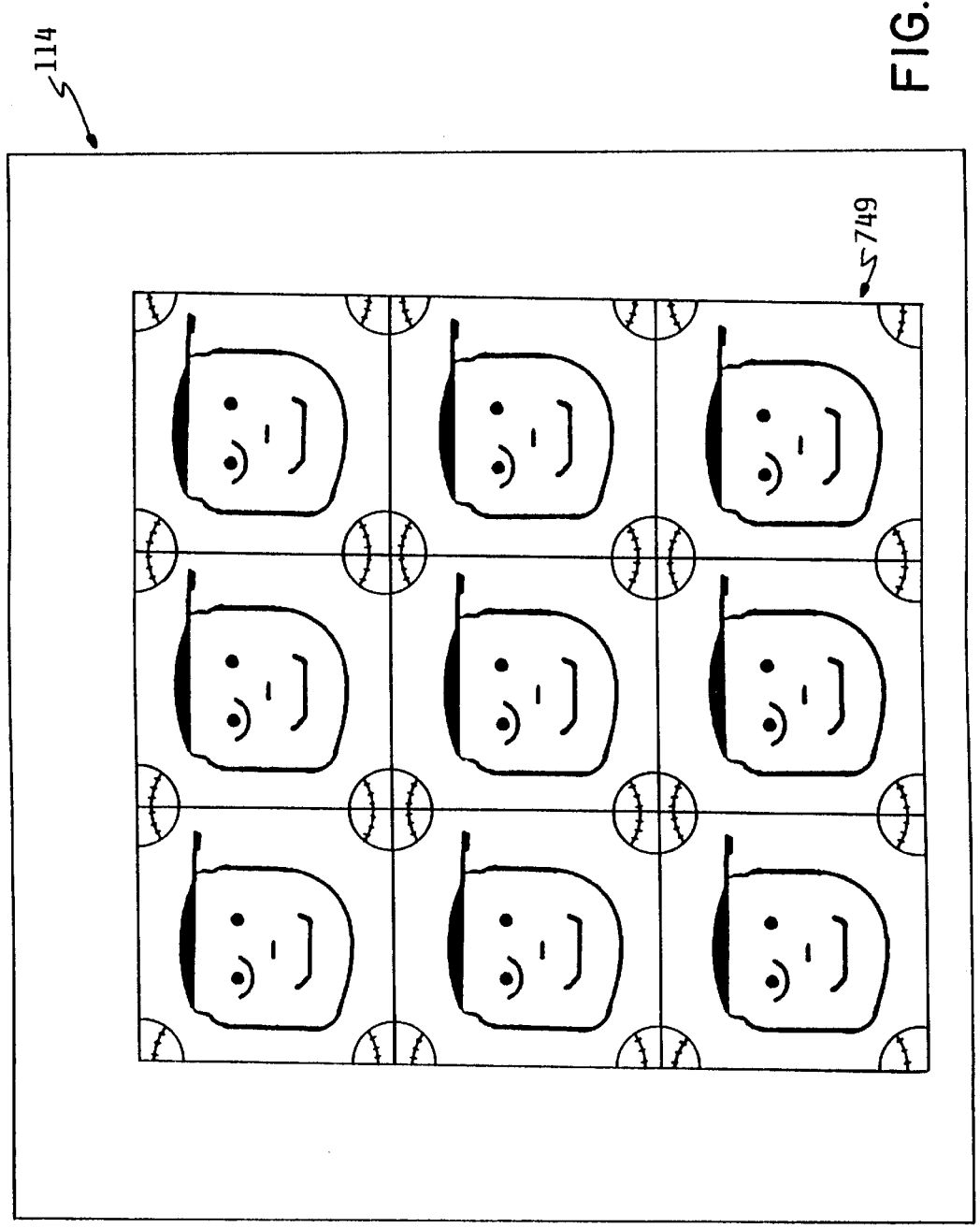

Referring to FIG. 7*e*, editor 399 has propagated image 716 across window 749 to create nine, simultaneously-displayed images.

Figure 7F:
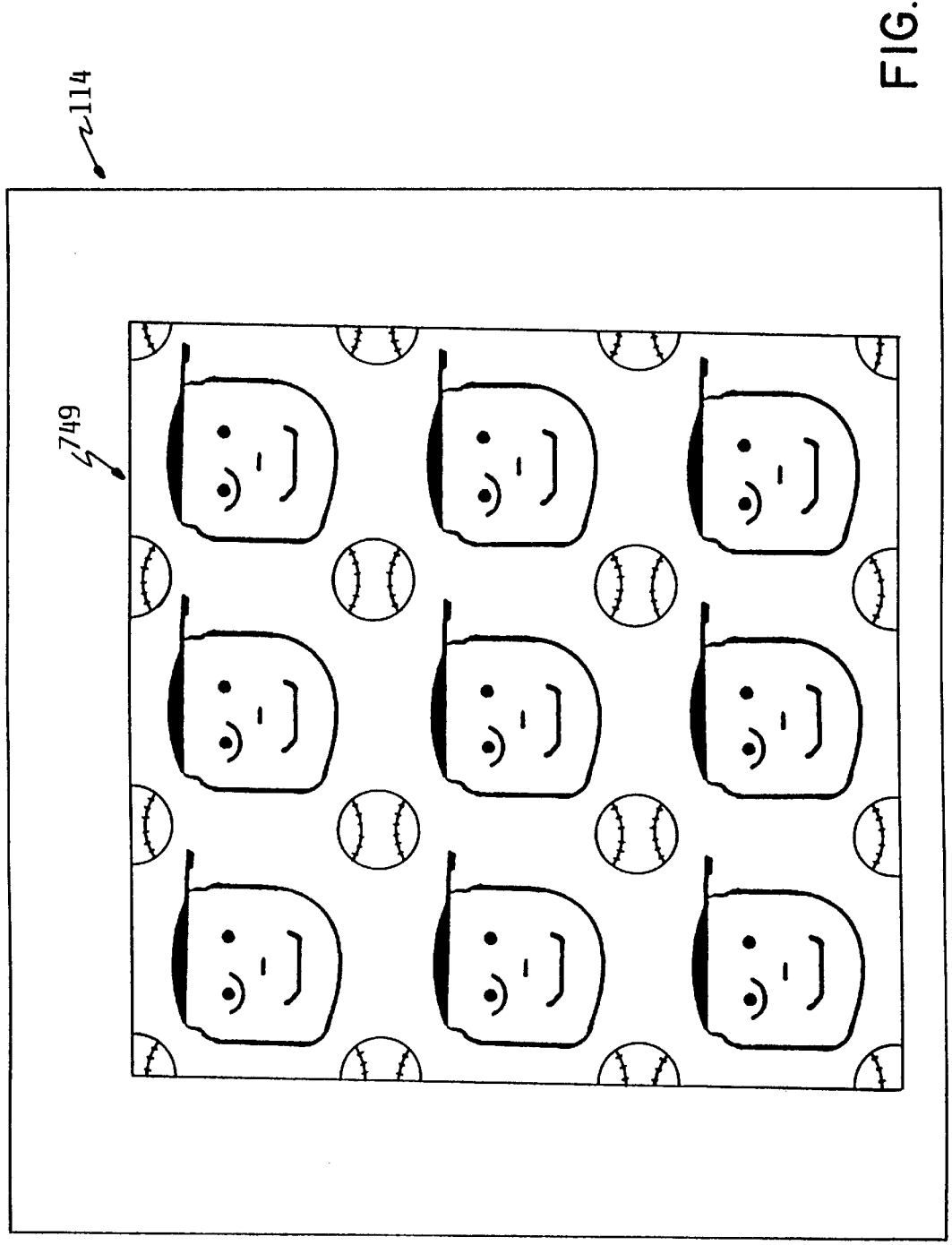

Referring to FIG. 7*f*, editor 399 has removed the borders from the images in window 749.

Figure 8:
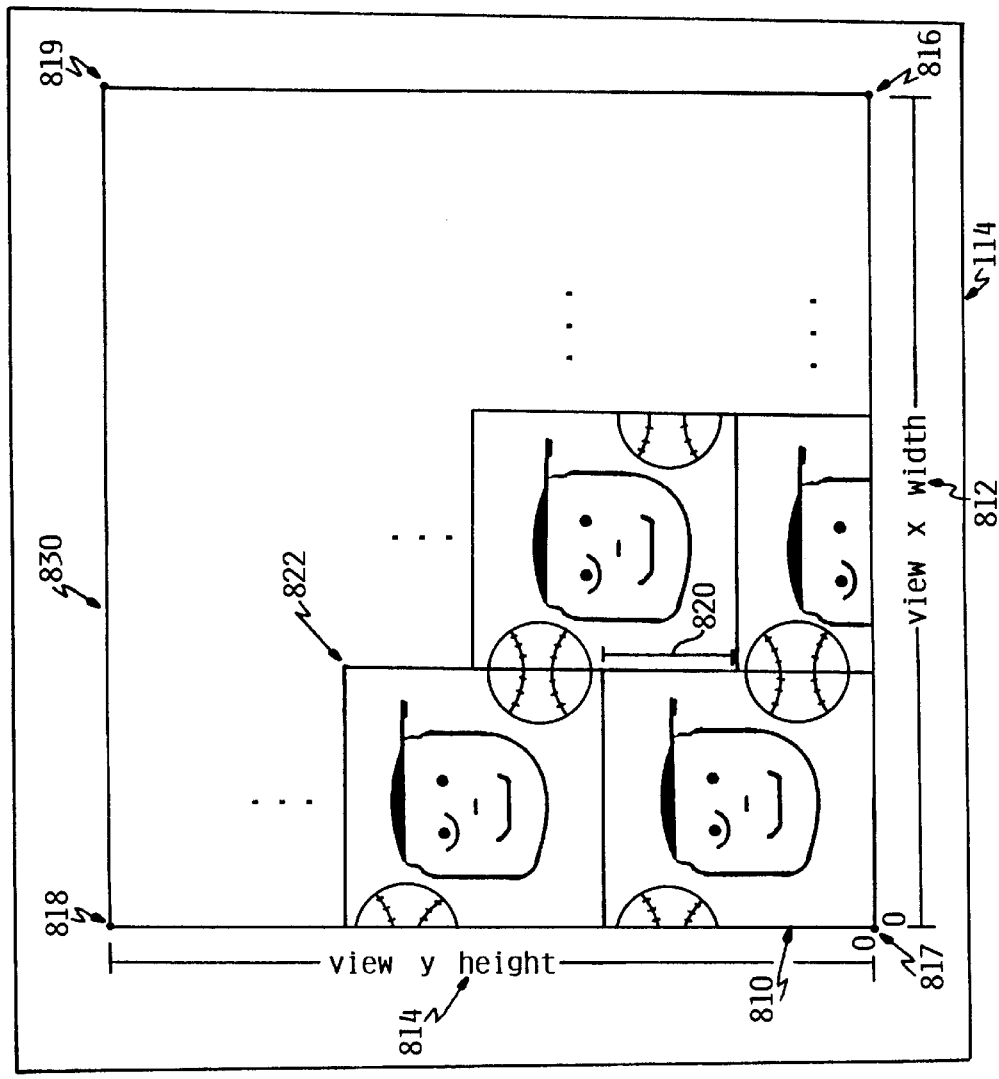
FIG. 8 is a pictorial illustration of the relationships of the control constructs to the screen images, in the preferred embodiment.

Referring to FIG. 8, there is illustrated a pictorial representation of window 830 on display screen 114, showing the relationships of the control constructs used by editor 399 to the screen images. In the preferred embodiment, window 830 is organized in a Cartesian coordinate system with a pixel being the smallest element, on the viewable surface of display screen 114, that can be independently assigned color and intensity. Thus, pixel 817 with the coordinates (0,0) is at the lower left-hand corner of window 830 on display screen 114 while pixel 819 with the coordinates (view_x_max, view_y_max) is at the upper right-hand corner of window 830. Pixel 816 with the coordinates (view_x_max,0) is at the lower right-hand corner of window 830. Pixel 818 with the coordinates (0,view_y_max) is at the upper left-hand corner of window 830. View_x_max is the maximum pixel address on the x-axis. View_y_max is the maximum pixel address on the y-axis. View_x_width 812 is the maximum width of the x-axis. View_y_height 814 is the maximum height of the y-axis. Thus, view_x_max=view_x_width−1 and view_y_max=view_y_height−1.

Editor 399 first writes border bitmap 303*a* in window 830 at image position 810 with its lower left-hand corner at coordinates (0,0) and then propagates bitmap 303*a* vertically to image 822, and so on. Editor 399 then begins propagating the image in the next column to the right. Editor 399 optionally shifts alternating columns of images down by tiling_y_offset 820, which is a value between 0 and −image_y_height. Alternatively, the images could be propagated horizontally across a row, and then alternating rows could be offset.

Figure 9:
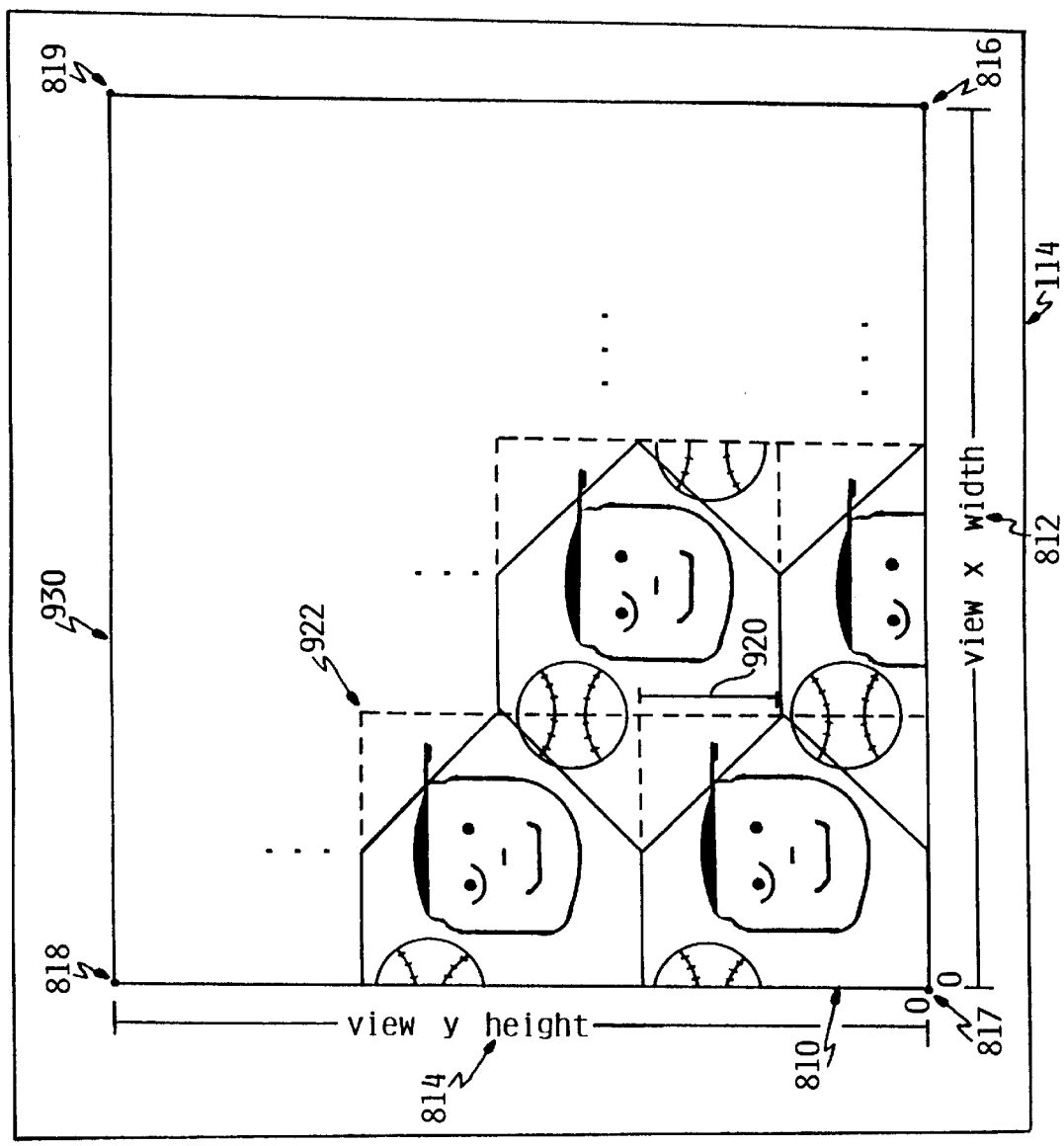
FIG. 9 is a pictorial illustration of screen images with hexagonal borders in an alternative embodiment.

Referring to FIG. 9, there is illustrated a pictorial representation of window 930 on display screen 114 showing hexagonal images with tiling_y_offset=-image_y_height/2. In FIGS. 8 and 9, like reference numerals correspond to like elements. Editor 399 first draws border bitmap 303b as image 910 with its lower left-hand corner being at coordinates (0,0) and then propagates it vertically to image 922, and so on. Editor 399 then begins propagating the image in the next column to the right. Editor 399 shifts alternating columns of images down by tiling_y_offset 920, which in this hexagonal embodiment is -image_y_height/2. The solid lines around the images are the borders while the addition of the dashed lines indicates the perimeter of the image, as previously described under the description for FIG. 5b. The dashed lines are not displayed in window 930, but are instead only shown in FIG. 9 in order to illustrate the correspondence of the display to border bitmap 303b in FIG. 5b. As can be seen by viewing FIG. 9 in conjunction with FIG. 5b, border bitmap 303b contains portions of three different hexagonal images when viewed in window 930.

Figure 10A:
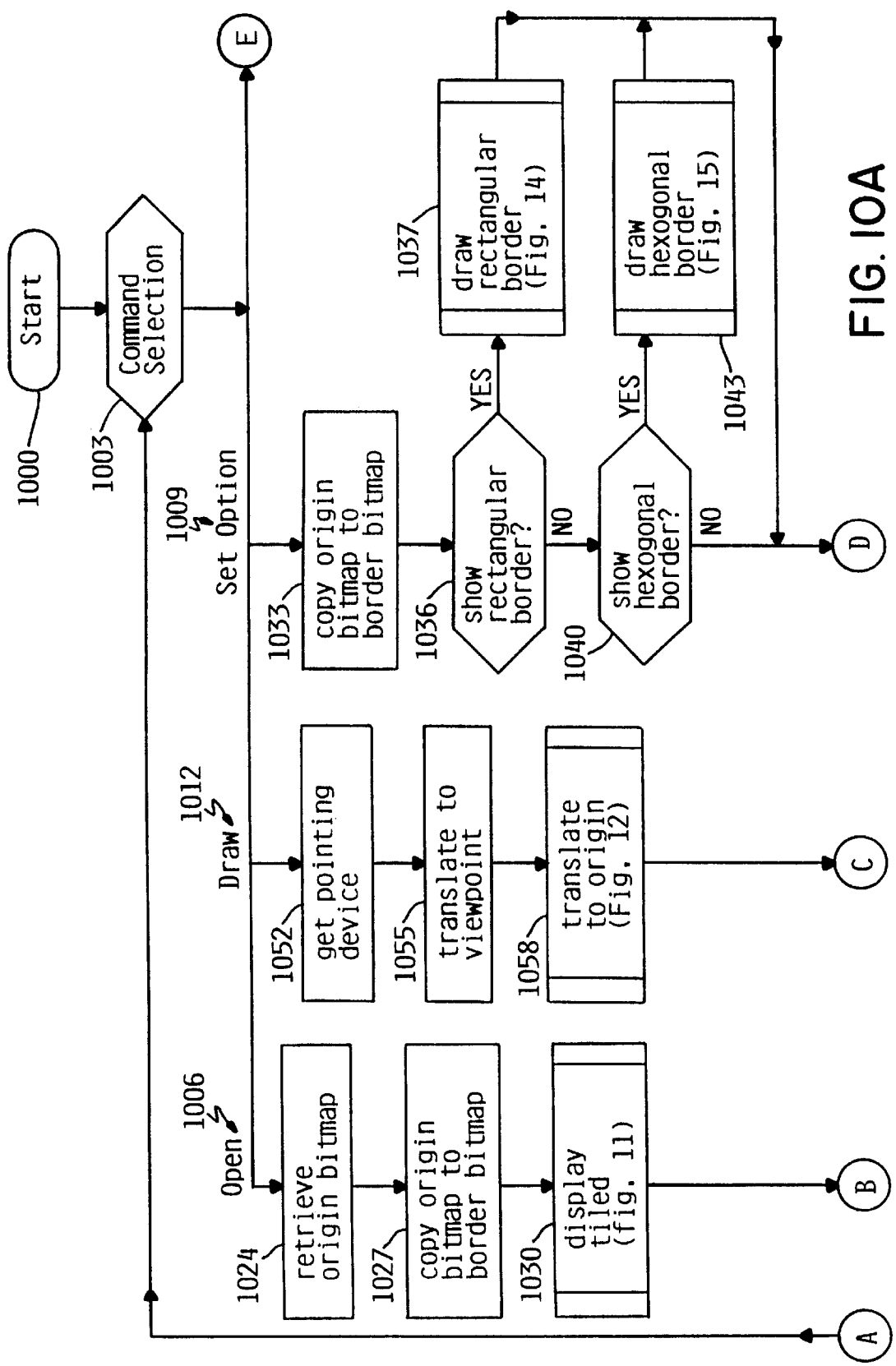
FIGS. 10–16 are flowcharts that describe the operation of the preferred embodiment.
Figure 10B:
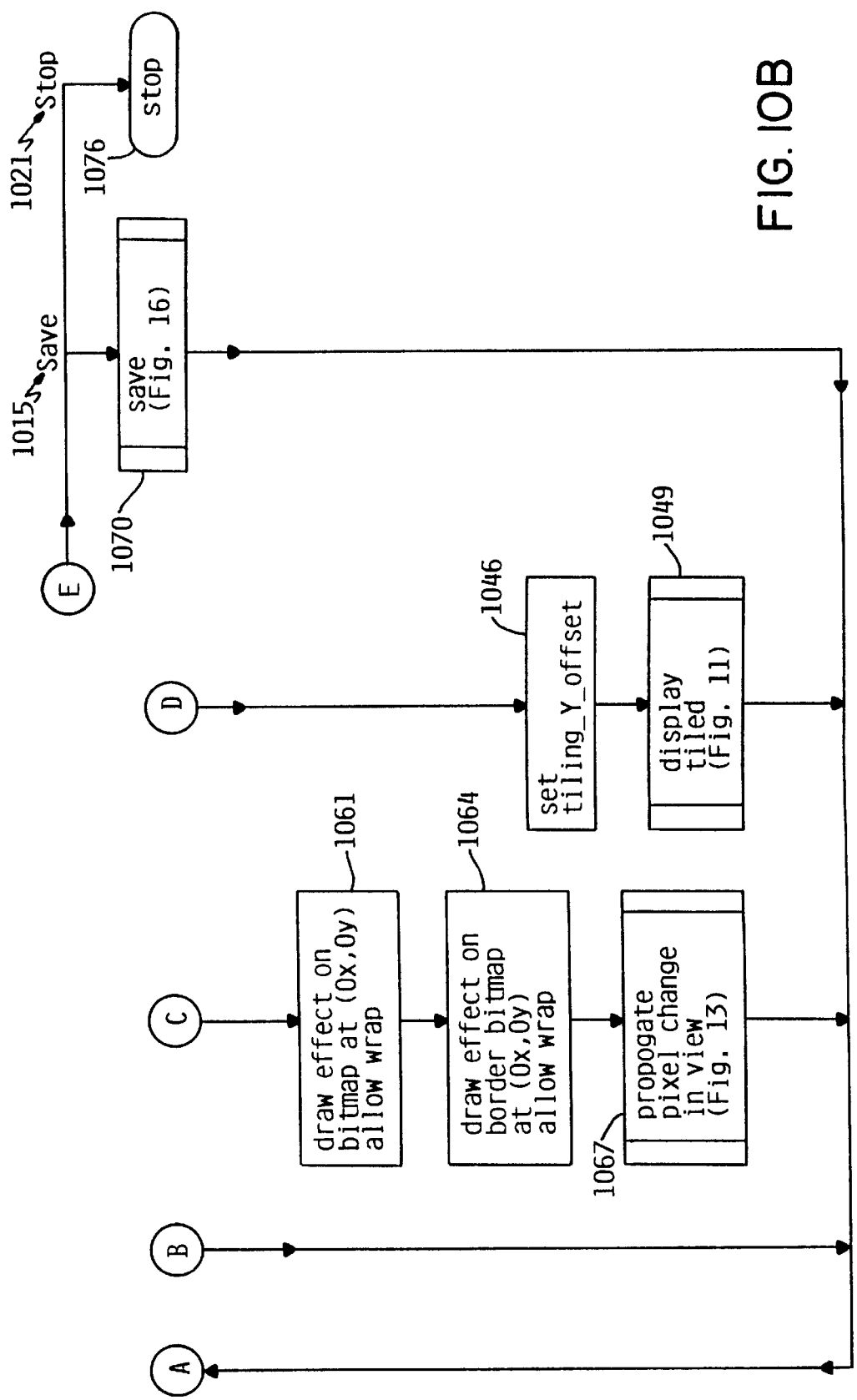

Referring to FIG. 10, there is illustrated an example of the logic executed by editor 399. At block 1000, execution starts. At block 1003, editor 399 determines which command operation the user has selected. Operations open, draw, set option, save, and stop are shown at blocks 1006, 1012, 1009, 1015, and 1021, respectively.

If the user has selected the open operation, then control continues to block 1024 where editor 399 retrieves origin bitmap 301, which was specified by the user. Control then continues to block 1027 where editor 399 copies origin bitmap 301 to border bitmap 303. Control then continues to block 1030 where editor 399 displays the tiled image of border bitmap 303 on the display screen, as further described under FIG. 9, below. Referring again to FIG. 10, control then returns to block 1003 where editor 399 begins processing of the next operation.

If the user-selected operation is "set option", then control continues to block 1033 where editor 399 copies origin bitmap 301 to border bitmap 303. Control then continues to block 1036 where editor 399 determines whether the user wants a rectangular boundary displayed around the image. If the user does want a rectangular boundary, then control continues block 1037 where editor 399 draws the boundary in border bitmap 303, as further described under the description for FIG. 14, below. Referring again to FIG. 10, control then continues to block 1046, as further described below.

If the user does not want a rectangular boundary, then control continues to block 1040, where editor 399 determines whether the user wants a hexagonal boundary. If the user does want a hexagonal boundary, then control continues to block 1043, where editor 399 draws the hexagonal boundary in border bitmap 303, as further described under the description for FIG. 15. Referring again to FIG. 10, control then continues to block 1046. If the user does not want a hexagonal boundary, then control continues directly to block 1046 from block 1040.

At block 1046, editor 399 sets the tiling offset (tiling_y_offset 820) from a user specified value on the set option command. The tiling offset is a value between zero and -image_y_height, which editor 399 will use to shift the position of alternating tiled columns down on display screen 114. Control then continues to block 1049, where editor 399 displays border bitmap 303 as tiled images, as further described under the description for FIG. 11. Referring again to FIG. 10, control then returns back to block 1003 where editor 399 begins processing the next operation.

If the operation is a draw command, then the user has utilized pointing device 118 and pointer 605 on display screen 114 to request a drawing change to the displayed tiled image. Control continues to block 1052 where editor 399 retrieves the pointing-device coordinates at which the user drew and the change value representing the video effect that the user drew at those coordinates. The coordinates retrieved in block 1052 are relative to the entire display screen. For example, the coordinates (0,0) might be the coordinates of the bottom left-most pixel on the display screen even though the window in which editor 399 is operating only takes up a small portion of the upper right-hand corner of the display screen. Control then continues to block 1055 where editor 399 translates the changed pixel coordinates into the viewpoint (Vx, Vy), which is relative to the window in which editor 399 is executing. An example of viewpoint (Vx,Vy) is pixel 690 in window 649, shown in FIG. 6b. Referring again to FIG. 10, in the preferred embodiment, editor 399 retrieves drawing changes one pixel at a time, although in an alternative embodiment multiple pixels could be retrieved.

Figure 12:
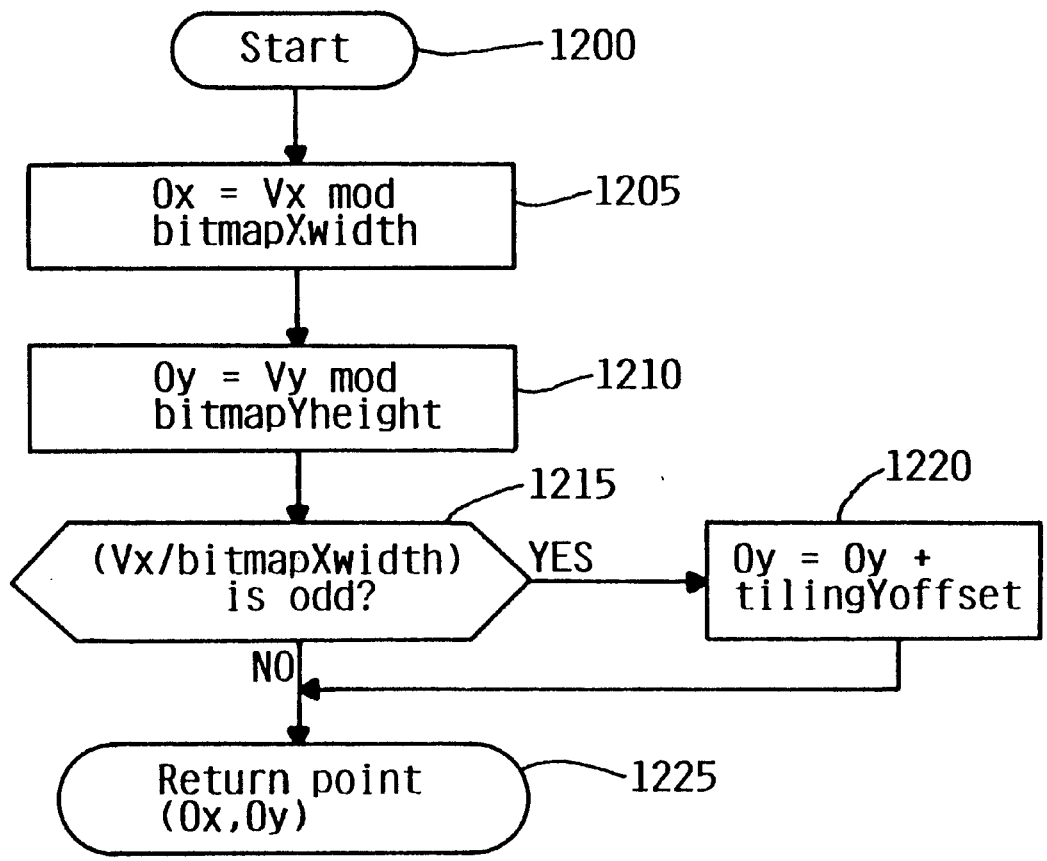

Control then continues to block 1058, where editor 399 translates (Vx,Vy) drawn by the user, which may be on any tiled image and relative to the entire tiled image, to coordinates (Ox, Oy), as further described under the description for FIG. 12. The coordinates (Ox, Oy) are relative to origin bitmap 301 (and also relative to border bitmap 303). Referring again to FIG. 10, control then continues to block 1061, where editor 399 draws the change requested by the user on origin bitmap 301 at coordinates (Ox, Oy). Control then continues to block 1064 where editor 399 draws the change requested by the user on border bitmap 303. Control then continues to block 1067, where editor 399 propagates the pixel change at (Ox, Oy) in border bitmap 303 to all images on display screen 114, as described under the description for FIG. 13, below. Referring again to FIG. 10, control then returns to block 1003, where editor 399 determines the next operation selected by the user.

Figure 16:
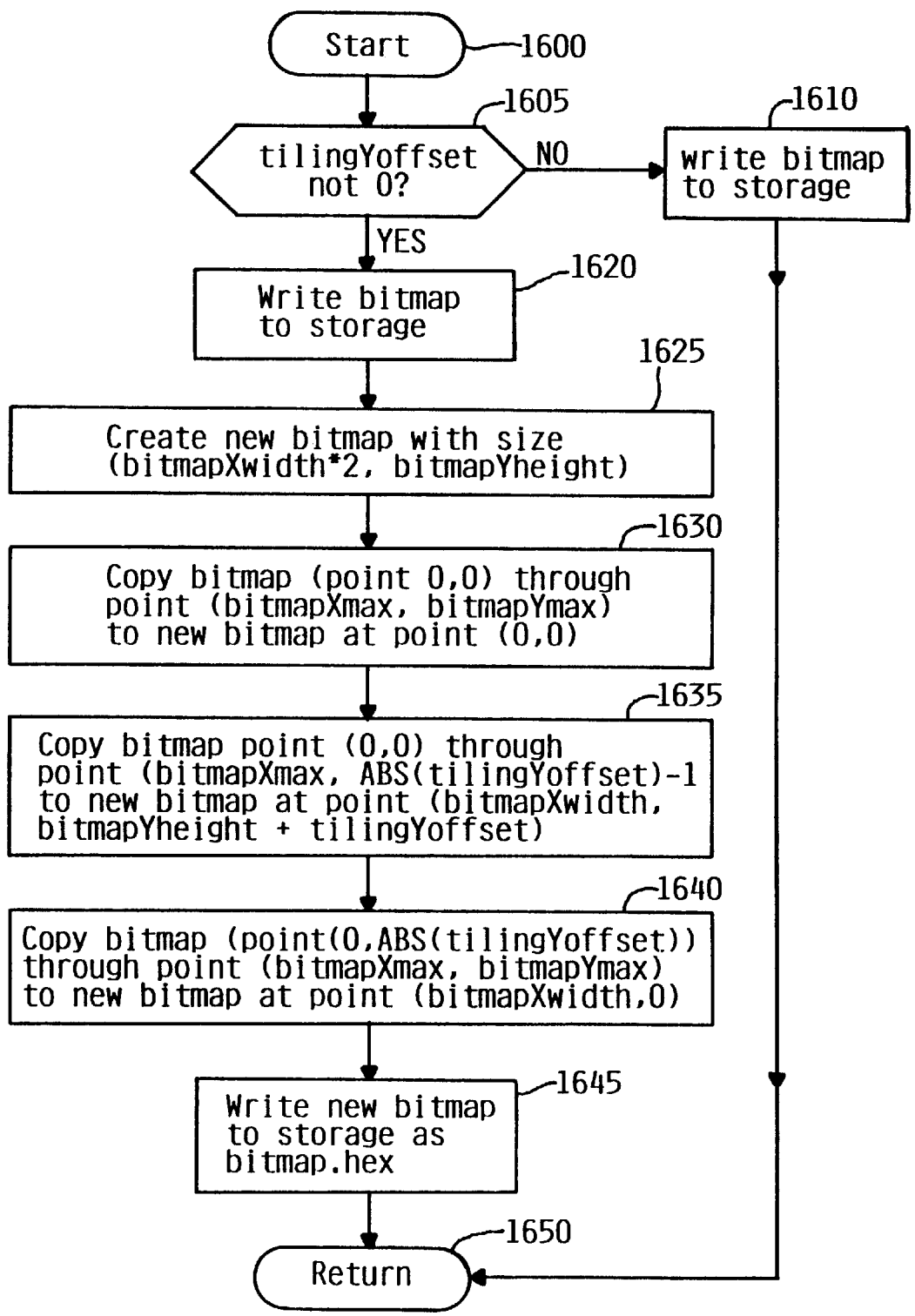

If the operation is a save operation, then control continues to block 1070, where editor 399 saves the displayed image to storage, as further described under the description for FIG. 16. Referring again to FIG. 10, control then returns to block 1003 where editor 399 determines the next operation selected by the user.

If the user-selected operation is "stop", then control continues to block 1076 where editor 399 stops.

Figure 11:
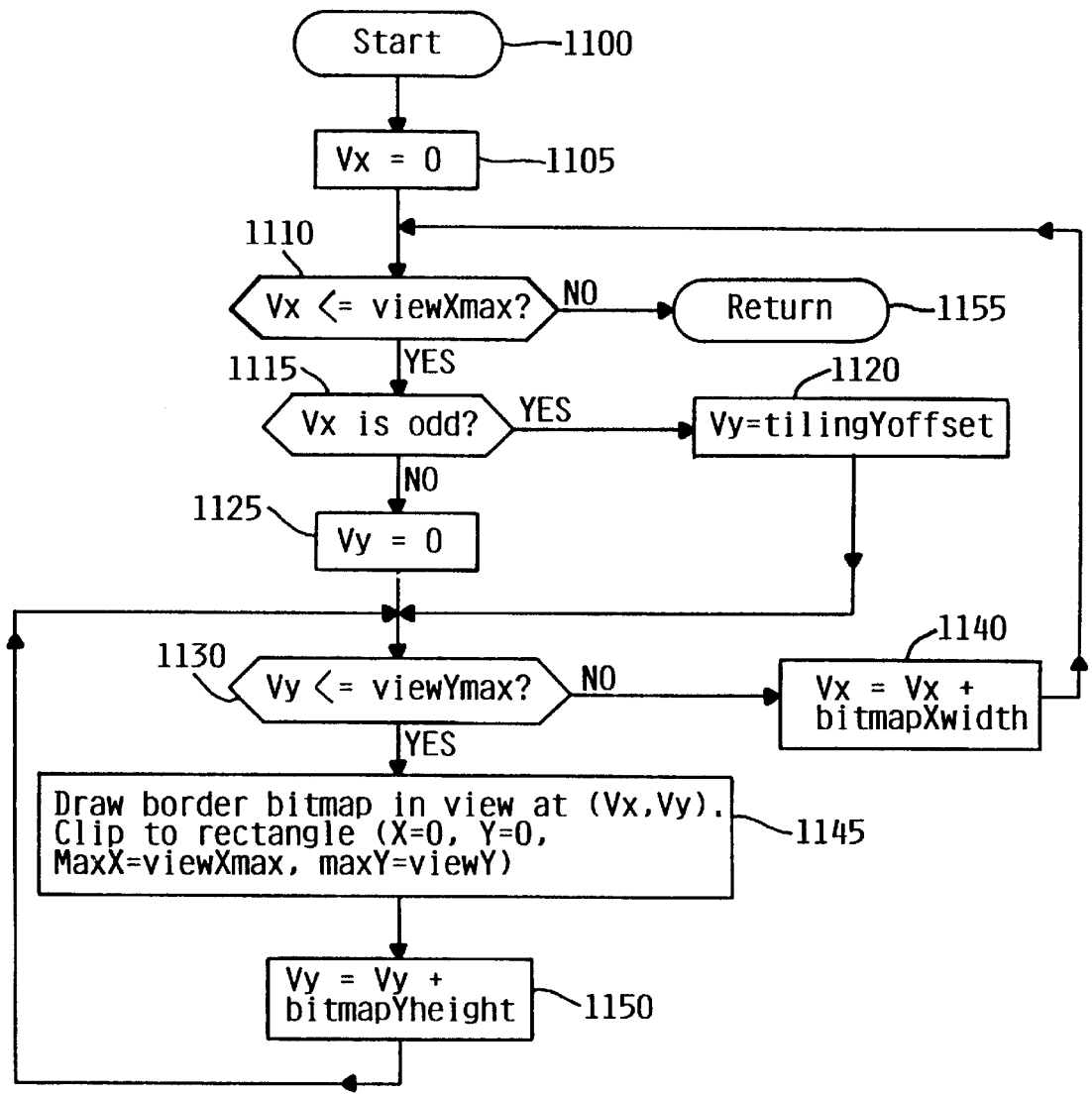

Referring to FIG. 11, there is illustrated an example of logic executed by editor 399 to display a tiled image on display screen 114. At block 1100, processing starts. At block 1105, editor 399 initializes variable Vx=0. Vx is a variable that editor 399 will use to indicate the coordinate on the x-axis where each tiled image will be displayed. Control then continues to block 1110 where editor 399 determines whether Vx is less than or equal to view_x_max, the maximum displayable x-axis coordinate on the current window in display screen 114. If Vx is greater than view_x_max, then this function of editor 399 returns at block 1155.

If Vx is less than or equal to view_x_max, then editor 399 continues to block 1115 where it determines whether Vx is odd. If Vx is odd then control continues block 1120 where editor 399 sets Vy equal to tiling_y_offset 820. Control then continues to block 1130. If Vx is not odd, then control continues to block 1125 where editor 399 sets Vy equal to 0, and control then continues to block 1130.

At block 1130, editor 399 determines whether Vy is less than or equal to view_y_max, the maximum y-axis coordinate. If Vy is not less than or equal to view_y_max, then control continues to block 1140 where editor 399 increments Vx by bitmap_x_width 434, the maximum width of the bitmap on the x-axis. Control then returns to block 1110.

If Vy is less than or equal to view_y_max, then control continues to block 1145 where editor 399 draws the image in border bitmap 303 on the display starting with the lower left-hand corner at coordinates (Vx, Vy). The minimum values for Vx and Vy are zero. The maximum value for Vx is view_x_max, the maximum possible coordinate in the x-axis for this window on display screen 114. The maximum value for Vy is view_y_max, the maximum coordinate value on the y-axis for this window on display screen 114. The draw function will clip the displayed image to these values, which will account for the image size not dividing evenly into the size of the window and also accounts for the odd columns of images being shifted down by the tiling_y_offset 820. Control then continues to block 1150 where editor 399 increments Vy by bitmap_y_height, the height of the image on the y-axis. Control then returns to block 1130.

Referring to FIG. 12, there is illustrated sample logic for a function in editor 399 that translates a given point (Vx, Vy) in the window to a corresponding point in original image bitmap 301. Control starts at block 1200. Control then continues to block 1205 where editor 399 sets Ox=Vx modulo bitmap_x_width 434, the width of the bitmap image on the x-axis. Modulo is a function that returns the remainder when Vx is divided by bitmap_x_width. Control then continues block 1210 where editor 399 sets Oy=Vy modulo bitmap_y_height 436, the height of the bitmap image on the y-axis. Once again, modulo is a remainder function. Control then continues to block 1215 where editor 399 determines whether Vx divided by bitmap_x_width 434 is odd. The division operation in block 1215 is an integer division. If the determination at block 1215 is true, then control continues to block 1220 where editor 399 increments Oy by tiling_y_offset 820. (Note that since tiling_y_offset 820 is a negative number, the effect of block 1220 is to decrement Oy.) Control then continues to block 1225 where the function returns the point (Ox, Oy). If the determination at block 1215 is false, then control continues directly to block 1225.

Figure 13:
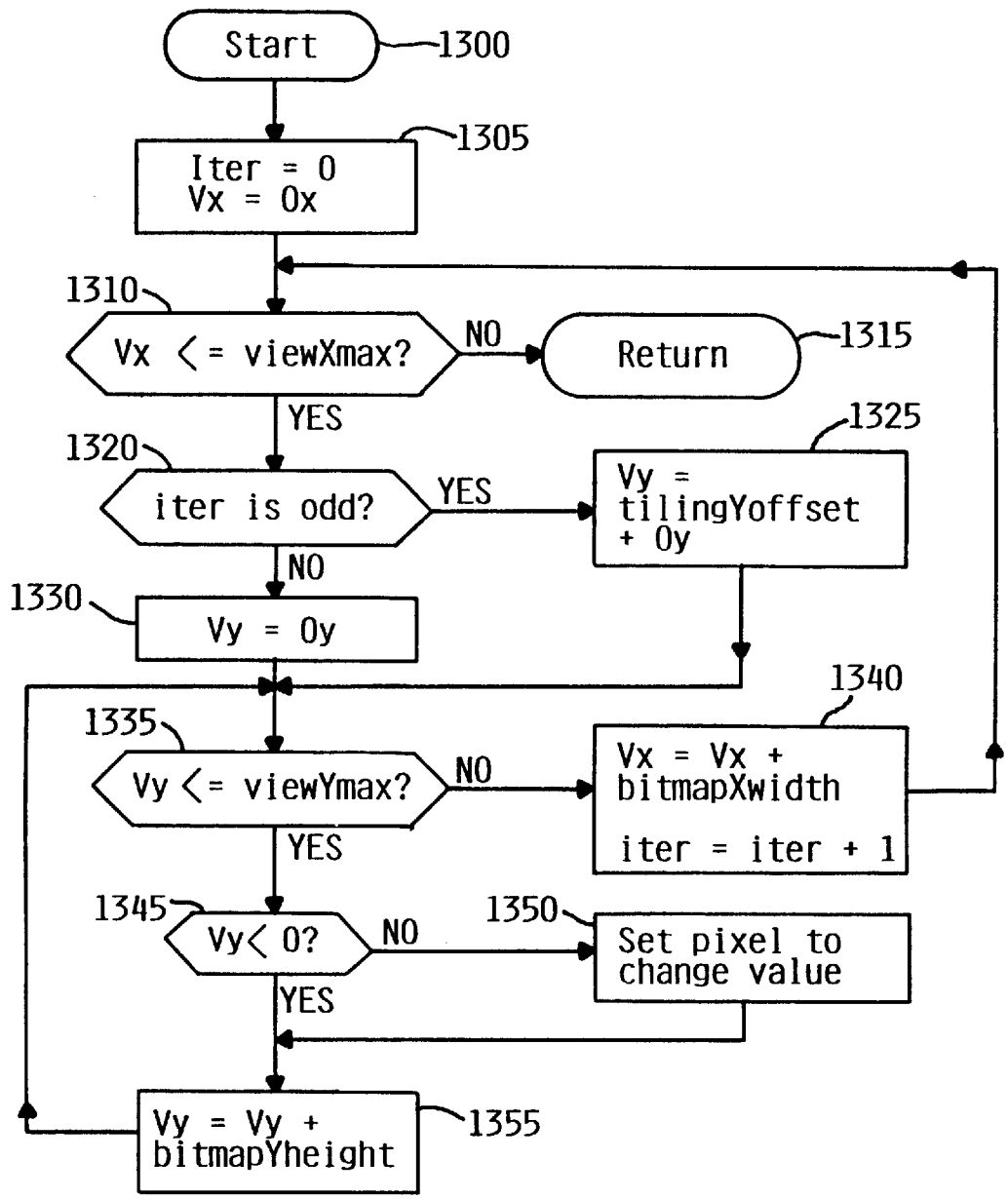

Referring to FIG. 13, there is illustrated sample logic for a function within editor 399 that propagates the change to a pixel at coordinates (Ox,Oy) in border bitmap 303 to all of the tiled images. Control starts at block 1300. Control then continues to block 1305 where editor 399 initializes variable "iter" to be zero and initializes Vx to be Ox. Control then continues to block 1310 where editor 399 determines whether Vx is less than or equal to view_x_max, the maximum coordinate on the x-axis on display 114. If the determination at block 1310 is false, then control continues to block 1315 where the function returns.

If the determination at block 1310 is true then control continues to block 1320 where editor 399 determines if variable iter is odd. If the determination at block 1320 is true then control continues to block 1325 where editor 399 sets Vy to be tiling_y_offset 820 plus Oy. Control then continues to block 1335. If the determination at block 1320 is false, then control continues from block 1320 to block 1330 where editor 399 sets Vy to be Oy. Control then continues to block 1335.

At block 1335, editor 399 determines whether Vy is less than or equal to view_y_max the maximum value on the y-axis for the window on display screen 114. If the determination at block 1335 is false then control continues to block 1340 where editor 399 increments Vx by bitmap_x_width 434, the width of the image on the x-axis, and also increments variable iter by one. Control then returns to block 1310.

If the determination at block 1335 is true then control continues to block 1345 where editor 399 determines whether Vy is less than zero. If the determination at block 1345 is false then control continues to block 1350 where editor 399 sets the pixel at coordinates (Vx, Vy) to be the change value returned previously by the get pointing-device function at block 1052 in FIG. 10. Referring again to FIG. 13, control then continues to block 1355. If the determination at block 1345 is true, then control continues directly from block 1345 to block 1355. At block 1355, editor 399 increments Vy by bitmap_y_height 436, the height of the bitmap on the y-axis. Control then returns to block 1335.

Figure 14:
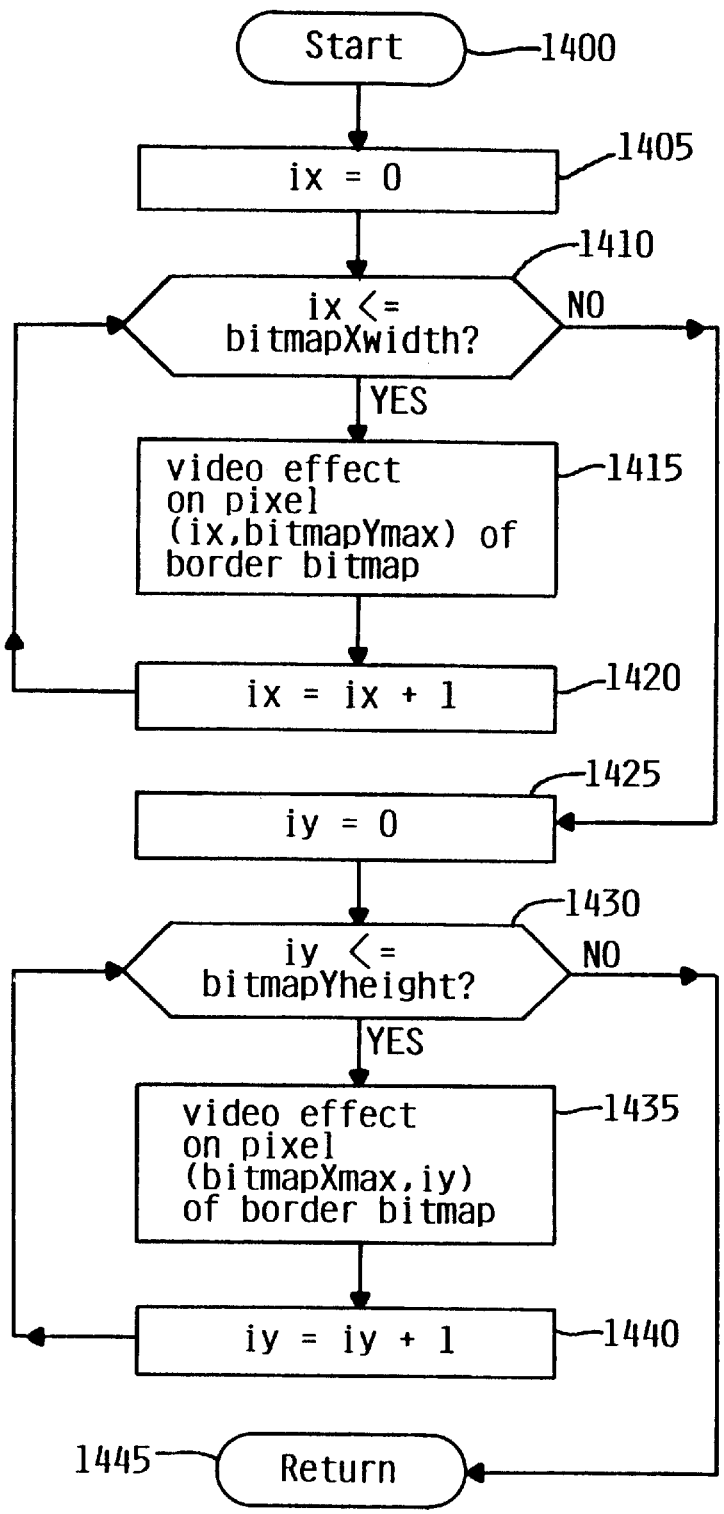

Referring to FIG. 14, there is illustrated sample logic for a draw boundary function, which draws a border on border bitmap 303. For example, this logic draws border 550 on border bitmap 303a in FIG. 5a, in the preferred embodiment. At block 1400 processing starts. Control then continues to block 1405 where editor 399 initializes the variable "ix" to be zero. Control then continues to block 1410 where editor 399 determines whether ix is less than or equal to bitmap_x_width 434, the width of the bitmap image on the x-axis. If the determination at block 1410 is true, then control continues to block 1415 where editor 399 draws a video effect on the pixel with coordinates (ix, bitmap_y_max). Control then continues to block 1420 where editor 399 increments ix by one. Control then returns to block 1410. The loop of blocks 1410, 1415, and 1420 continues until the determination at block 1410 is false.

When the determination at block 1410 is false, then control continues to block 1425 where editor 399 initializes iy to be zero. Control then continues to block 1430 where editor 399 determines whether iy is less than or equal to bitmap_y_height 436, the height of the bitmap image in the y-axis. If the determination at block 1430 is true, then control continues to block 1435 where editor 399 draws a video effect on the pixel with the coordinates (bitmap_x_max, iy). The video effect function draws a border on the specified pixel. Control then continues to block 1440 where editor 399 increments iy by one. Control then returns to block 1430. The loop of blocks 1430, 1435, and 1440 continues until the determination at block 1430 is false.

When this determination is false, then the draw boundary function returns at block 1445.

Figure 15:
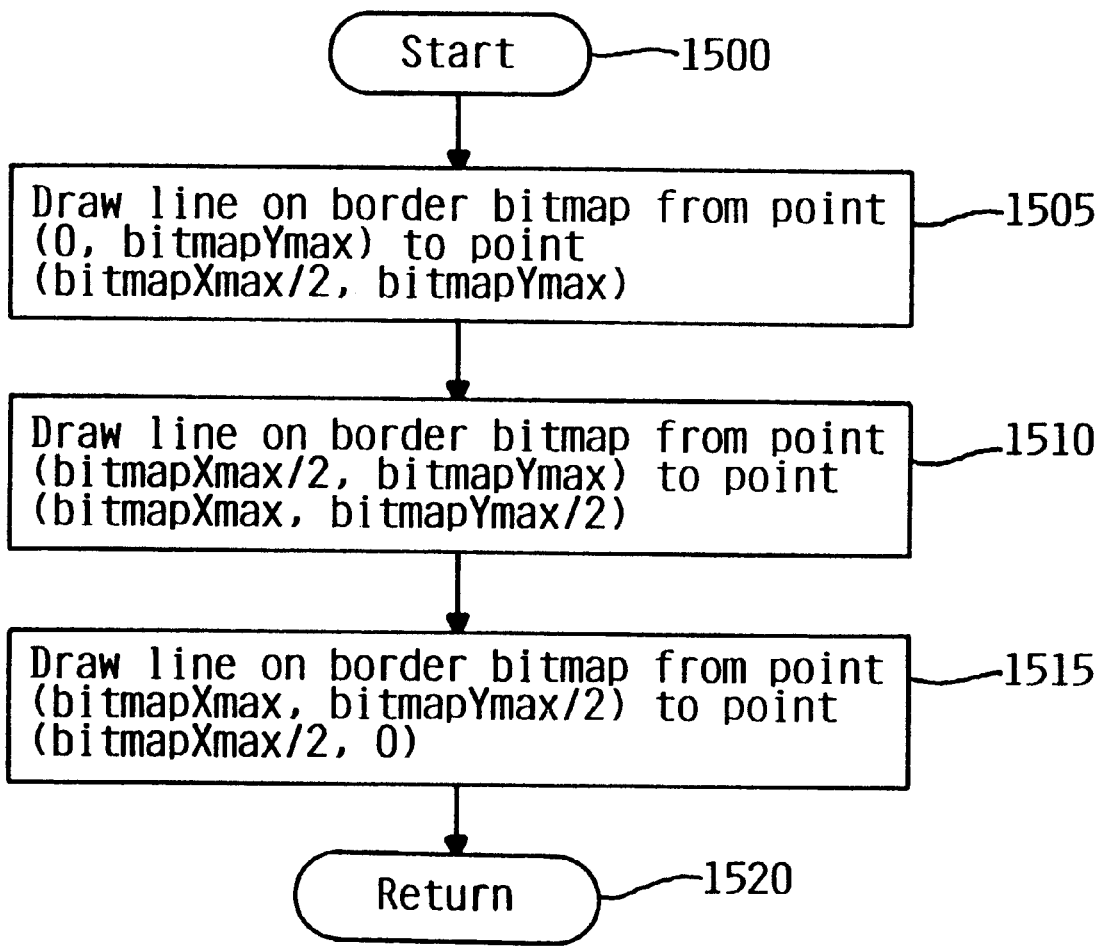

Referring to FIG. 15, there is illustrated sample logic for drawing a hexagonal border on border bitmap 303b. Control starts at block 1500. Control then continues to block 1505, where editor 399 draws a line on the image from point (0, bitmap_y_max) to point (bitmap_x_max/2, bitmap_y_max). The logic of block 1505 draws line 501 in FIG. 5b. Referring again to FIG. 15, control then continues to block 1510, where editor 399 draws a line on the image from point (bitmap_x_max/2, bitmap_y_max) to a point with coordinates (bitmap_x_max, bitmap_y_max/2). The logic of block 1510 draws line 502 in FIG. 5b. Referring again to FIG. 15, control then continues to block 1515 where editor 399 draws a line on the bitmap image from point (bitmap_x_max, bitmap_y_max/2) to a point with coordinates (bitmap_x_max/2, 0). The logic of block 1515 draws line 503 in FIG. 5b.

Control then continues to block 1520 where the function returns.

Figure 17:
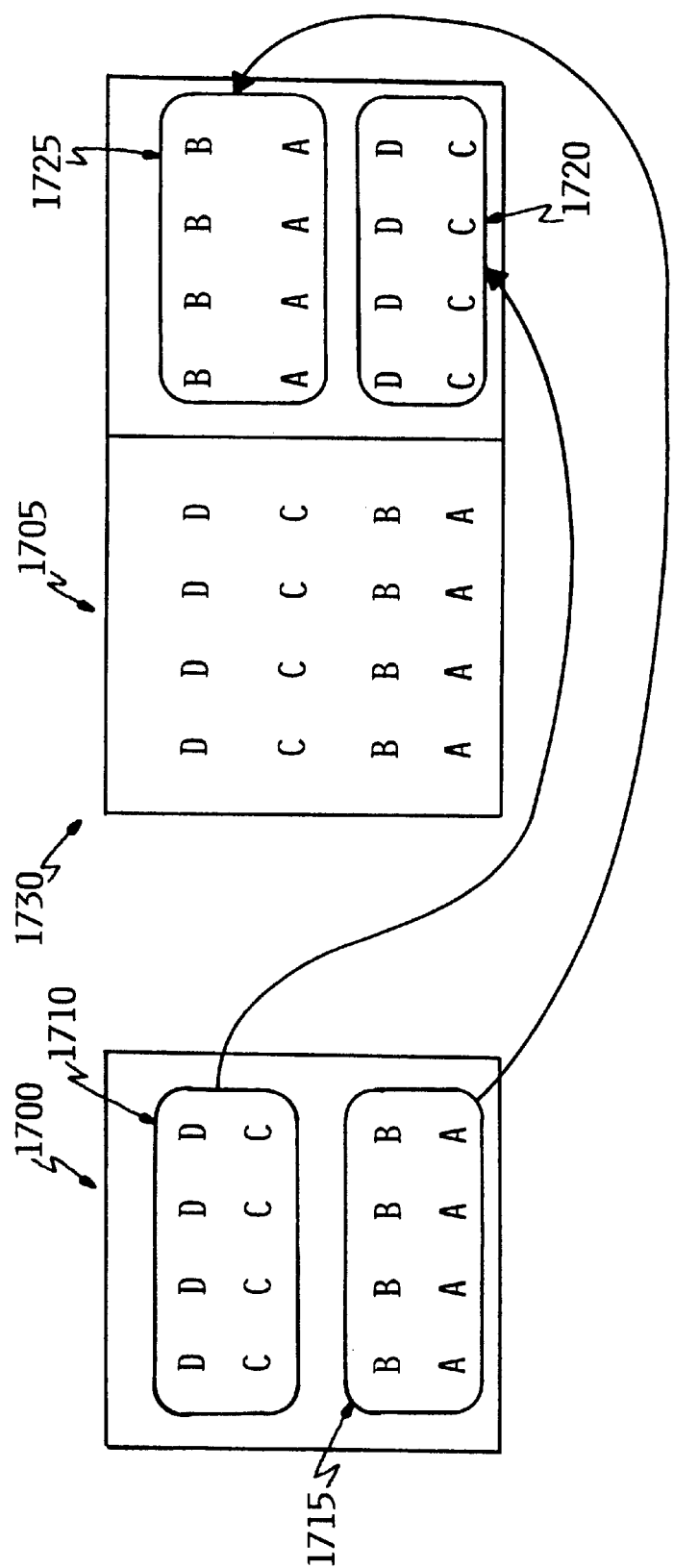
FIG. 17 is a block diagram of an example of the operation performed by the logic of FIG. 16.

Referring to FIG. 16, there is illustrated sample logic for saving the image to secondary storage. At block 1600, control starts. At block 1605, editor 399 determines if the tiling_y_offset is not equal to zero. If tiling_y_offset is equal to zero, then control continues to block 1610 where editor 399 writes bitmap 301 to secondary storage. Control then continues to block 1650 where the logic returns. If the determination at block 1605 is true and tiling_y_offset is not equal to zero, then control continues to block 1620 where editor 399 writes bitmap 301 to secondary storage. In the example of FIG. 17, bitmap 1700 is written to secondary storage.

Referring again to FIG. 16, control then continues to block 1625 where editor 399 creates a new bitmap 1730 that has a width on the x-axis that is twice the width of the original bitmap and a height on the y-axis that is the same height as the original bitmap. Control then continues to block 1630 where editor 399 copies the original bitmap to the new bitmap. In the example of FIG. 17, the logic of block 1630 copies bitmap 1700 to section 1705 of bitmap 1730.

Referring again to FIG. 16, at block 1635 editor 399 copies the bottom portion of the original bitmap to the upper right-hand portion of the new bitmap. In the example of FIG. 17, the logic of block 1635 copies bitmap section 1715 to bitmap section 1725.

Referring again to FIG. 16, control then continues to block 1640 where editor 399 copies the top portion of the original bitmap to the lower right-hand portion of the new bitmap. In the example of FIG. 17, the logic of block 1640 copies bitmap portion 1710 to bitmap portion 1720.

Referring again to FIG. 16, control then continues to block 1645 where editor 399 writes the new bitmap to secondary storage.

Control then continues to block 1650 where the save function returns.

Referring to FIG. 17, the operation performed by the logic of FIG. 16 is illustrated. Editor 399 creates new bitmap 1730 from bitmap 1700. Bitmap portion 1705 is an exact copy of bitmap 1700. Editor 399 copies bitmap portion 1725 from bitmap portion 1715, and bitmap portion 1720 from bitmap portion 1710. The sizes of bitmap portions 1710 and 1715 are chosen based on tiling_y_offset 820 or tiling_y_offset 920.

The purpose of the save operation of blocks 1620–1645 is to allow image editors that do not support tiling_y_offset to tile the image correctly.

While this invention has been described with respect to the preferred and alternative embodiments, it will be understood by those skilled in the art that various changes in detail may be made therein without departing from the spirit, scope, and teaching of the invention. For example, tiled displays may become widely employed in consumer applications such as operator panels for consumer electronics and appliances. Accordingly, the herein disclosed invention is to be limited only as specified in the following claims.

What is claimed is:

1. A method for editing a tiled image, comprising:
   creating a plurality of simultaneously displayed tiles on a display, said plurality of simultaneously displayed tiles being arranged abutting one another in a regular pattern, each tile containing a respective image, wherein all of the plurality of images are copied from a singular source;
   interactively editing and displaying a first change to a first one of the plurality of images; and
   automatically propagating the first change to all of the plurality of images on the display.

2. The method of claim 1, further comprising:
   displaying a plurality of borders between the plurality of simultaneously displayed tiles prior to displaying the first change.

3. The method of claim 2, further comprising:
   removing the plurality of borders after propagating the first change.

4. The method of claim 1, further comprising:
   displaying a second change to a second one of the plurality of images; and
   propagating the second change to all of the plurality of images on the display.

5. The method of claim 4, wherein the first and second images are the same image.

6. The method of claim 4, wherein the first and second images are different images and wherein one of the plurality of borders is between the first and second changes.

7. The method of claim 1, wherein a user selects the first one of the plurality of tiles.

8. The method of claim 1, wherein the plurality of tiles are rectangular in shape.

9. The method of claim 1, wherein each of the plurality of tiles is hexagonal in shape.

10. The method of claim 1, wherein the plurality of tiles are displayed in a tabular form having adjacent horizontal rows and vertical columns.

11. The method of claim 10, wherein alternating rows are offset by an amount.

12. The method of claim 10, wherein alternating columns are offset by an amount.

13. The method of claim 1, wherein the singular source is a bitmap in memory of pixels on the display.

14. The method of claim 1, wherein the propagating step further comprises copying the change to the source and then copying the change to all of the plurality of images on the display.

15. The method of claim 12, further comprising:
   creating a new source, wherein the new source has a width twice that of the source and a height equal to the source, and wherein the new source has a left portion, a top-right portion, and a bottom-right portion, wherein the proportion of the top-right portion to the bottom-right portion is determined from the offset amount;
   copying the source to the left portion of the new source;
   copying a top portion of the source to the bottom-right portion of the new source; and
   copying a bottom portion of the source to the top-right portion of the new source.

16. An apparatus for editing a tiled image, comprising:
   an editor that creates a plurality of simultaneously displayed tiles on a display, said plurality of simultaneously displayed tiles being arranged abutting one another in a regular pattern, each tile containing a respective image, wherein all of the plurality of images are copied from a singular source,
   wherein the editor interactively receives and displays a user-specified first change to a first one of the plurality of images,
   and wherein the editor automatically propagates the first change to all other images on the display.

17. The apparatus of claim 16, wherein the editor further displays a plurality of borders around the plurality of simultaneously displayed tiles prior to displaying the first change.

18. The apparatus of claim 16, wherein the editor further removes the plurality of borders after propagating the first change.

19. The apparatus of claim 16, wherein the editor further displays a second change to a second one of the plurality of images, and wherein the editor propagates the second change to all the other images on the display.

20. The apparatus of claim 16, wherein the first and second images are the same image.

21. The apparatus of claim 16, the first and second images are different images.

22. The apparatus of claim 16, wherein a user selects the first one of the plurality of tiles.

23. The apparatus of claim 16, wherein the plurality of tiles are rectangular in shape.

24. The apparatus of claim 16, wherein each of the plurality of tiles is hexagonal in shape.

25. A program product for editing a tiled image, comprising:

an editor that creates a plurality of simultaneously displayed tiles on a display, said plurality of simultaneously displayed tiles being arranged abutting one another in a regular pattern, each tile containing a respective image, wherein the editor copies all of the plurality of images from a singular source, and wherein the editor further interactively receives and displays a user-specified first change to a first one of the plurality of images, and wherein the editor further automatically propagates the first change to all of the plurality of images on the display; and signal-bearing media bearing the editor.

26. The program product of claim 25, wherein the editor further displays a plurality of borders between the plurality of simultaneously displayed tiles prior to the editor displaying the first change.

27. The program product of claim 25, wherein the editor further removes the plurality of borders after propagating the first change.

28. The program product of claim 25, wherein the editor further displays a second change to a second one of the plurality of images and propagates the second change to all of the plurality of images on the display.

29. The program product of claim 25, wherein the first and second images are the same image.

30. The program product of claim 25, wherein the first and second images are different images and wherein one of the plurality of borders is between the first and second changes.

31. The program product of claim 25, wherein a user selects the first one of the plurality of tiles.

32. The program product of claim 25, wherein the plurality of tiles are rectangular in shape.

33. The program product of claim 25, wherein each of the plurality of tiles is hexagonal in shape.

34. The program product of claim 25, wherein the editor displays the plurality of tiles in a tabular form having adjacent horizontal rows and vertical columns.

35. The program product of claim 25, wherein the editor displays alternating rows offset by an amount.

36. The program product of claim 25, wherein the editor displays alternating columns offset by an amount.

37. The program product of claim 25, wherein the singular source is a bitmap in memory of pixels on the display.

38. The program product of claim 25, wherein the editor copies the change to the source and then copies the change to all of the plurality of images on the display.

39. The program product of claim 36, wherein the editor further creates a new source, wherein the new source has a width twice that of the source and a height equal to the source, and wherein the new source has a left portion, a top-right portion, and a bottom-right portion, wherein the proportion of the top-right portion to the bottom-right portion is determined from the offset amount, and wherein the editor copies the source to the left portion of the new source, and wherein the editor copies a top portion of the source to the bottom-right portion of the new source, and wherein the editor copies a bottom portion of the source to the top-right portion of the new source.

40. An apparatus for editing an image, comprising:

an editor that displays a tile containing a first image, wherein the tile has a border around the tile's perimeter, wherein the editor further splits the tile into a plurality of portions, wherein each portion includes a section of the border, the portions of said tile forming said first image in a first configuration, wherein the editor assembles the portions into a second configuration to form a second image, wherein the second configuration has each section of the border adjacent and parallel to another section, wherein the editor creates a third image by receiving and displaying a user-specified change to the second image, wherein the change crosses from one of the portions into another of the portions, and wherein the editor reassembles portions forming the third image into said first configuration to form a fourth image, wherein the fourth image has the same portion and border configuration as the first image.

41. The apparatus of claim 40, wherein the editor further copies the fourth image to a plurality of simultaneously-displayed images.

42. The apparatus of claim 41, wherein the editor further removes the borders from the plurality of images.

* * * * *